(12) United States Patent
Zhao et al.

(10) Patent No.: US 8,804,560 B2
(45) Date of Patent: Aug. 12, 2014

(54) ELECTRONIC DEVICES, METHODS, AND COMPUTER PROGRAM PRODUCTS FOR SELECTING AN ANTENNA ELEMENT BASED ON A WIRELESS COMMUNICATION PERFORMANCE CRITERION

(75) Inventors: Kun Zhao, Stockholm (SE); Shuai Zhang, Solna (SE); Zhinong Ying, Lund (SE); Erik Lennart Bengtsson, Eslöv (SE); Rickard Ljung, Helsingborg (SE); Sailing He, Åkersberga (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 148 days.

(21) Appl. No.: 13/480,048

(22) Filed: May 24, 2012

(65) Prior Publication Data
US 2013/0315076 A1 Nov. 28, 2013

(51) Int. Cl.
*G01R 31/08* (2006.01)
(52) U.S. Cl.
USPC ........................................................ 370/252
(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| | | | |
|---|---|---|---|
| 2010/0222012 A1 | 9/2010 | Shibuya et al. | |
| 2011/0249576 A1* | 10/2011 | Chrisikos et al. | 370/252 |
| 2011/0273977 A1* | 11/2011 | Shapira et al. | 370/208 |

FOREIGN PATENT DOCUMENTS

JP  2004 363863 A  12/2004

OTHER PUBLICATIONS

Partial European Search Report corresponding to European Application No. 13164047.6, Date of mailing: Oct. 2, 2013, 7 pages.

* cited by examiner

*Primary Examiner* — Jung-Jen Liu
(74) *Attorney, Agent, or Firm* — Myers Bigel Sibley & Sajovec, PA

(57) ABSTRACT

A method of operating an electronic device includes providing a plurality of antenna elements, evaluating a wireless communication performance criterion to obtain a performance evaluation, and assigning a first one of the plurality of antenna elements to a main wireless signal reception and transmission path and a second one of the plurality of antenna elements to a diversity wireless signal reception path based on the performance evaluation.

19 Claims, 22 Drawing Sheets

ELECTRONIC DEVICES, METHODS, AND COMPUTER PROGRAM PRODUCTS FOR SELECTING AN ANTENNA ELEMENT BASED ON A WIRELESS COMMUNICATION PERFORMANCE CRITERION

BACKGROUND OF THE INVENTION

Wireless communication devices, such as WIFI 802.11N and LTE compliant communication devices, are increasingly using Multiple Input-Multiple Output (MIMO) antenna technology to provide increased data communication rates with decreased error rates. A MIMO antenna includes at least two antenna elements.

MIMO technology may offer significant increases in data throughput and/or transmission range without the need for additional bandwidth or transmit power. It can achieve this due to the ability of MIMO to obtain higher spectral efficiency (more bits per second per hertz of bandwidth) and/or reduced fading.

MIMO based systems allow the use of a variety of coding techniques that take advantage of the presence of multiple transmit and receive antennas. For example, wireless communications performed over a MIMO channel can use beamforming, spatial multiplexing and/or diversity coding techniques.

The operational performance of a MIMO antenna depends upon obtaining sufficient decoupling and decorrelation between its antenna elements. It is therefore usually desirable to position the antenna elements far apart within a device and/or to use radiofrequency (RF) shielding therebetween while balancing its size and other design constraints.

Correlation between antennas can also be reduced by causing the antennas to have different polarizations, i.e. sending and receiving signals with orthogonal polarizations. Furthermore, antennas for MIMO systems may utilize spatial separation, or physical separation, to reduce correlation between antennas.

Mobile terminals may need to cover multiple-bands in Long Term Evolution (LTE) environments. Antenna systems may, therefore, be required to cover up to seven different frequency bands, for example. In addition, the antenna systems may be required to meet the requirements of Single Input-Single Output (SISO) and Single Input-Multiple Output (SIMO) for 3GPP and 2G bands. The antenna configuration will generally be required to fulfill Specific Absorption Rate (SAR) requirements and other industry standards as well. User effects, such as the way a user holds a mobile terminal relative to the positioning of the antenna elements therein may affect the over the air performance of the device.

SUMMARY

According to some embodiments of the present invention, a method of operating an electronic device includes providing a plurality of antenna elements, evaluating a wireless communication performance criterion to obtain a performance evaluation, and assigning a first one of the plurality of antenna elements to a main wireless signal reception and transmission path and a second one of the plurality of antenna elements to a diversity wireless signal reception path based on the performance evaluation.

In other embodiments, evaluating the wireless communication performance criterion comprises determining transmission power for signals transmitted through each of the plurality of antenna elements and power associated with signals reflected back through each of the plurality of antenna elements.

In still other embodiments, evaluating the wireless communication performance criterion comprises determining Received Signal Strength Indication (RSSI) data for each of the plurality of antenna elements.

In still other embodiments, evaluating the wireless communication performance criterion comprises processing feedback from a wireless basestation, the feedback including signal strength information for signals transmitted from each of the plurality of antenna elements.

In still other embodiments, evaluating the wireless communication performance criterion comprises determining proximity information of structure abutting the mobile terminal via at least one sensor.

In still other embodiments, the method further comprises determining whether first and second communication channels associated with the main wireless signal reception path and the diversity wireless signal reception path, respectively, have changed and updating channel estimation models and/or multipath mitigation modules in a digital baseband signal processing section of the electronic device responsive to a determination that the first and second communication channels associated with the main wireless signal reception path and the diversity wireless signal reception path, respectively, have changed.

In still other embodiments, the method further comprises determining whether first and second communication channels associated with the main wireless signal reception path and the diversity wireless signal reception path, respectively, have changed, routing signals received on the first communication channel through the diversity wireless signal reception path in a radio frequency processing section of the electronic device and through the main wireless signal reception path in a digital baseband signal processing section of the electronic device responsive to a determination that the first and second communication channels associated with the main wireless signal reception path and the diversity wireless signal reception path, respectively, have changed, and routing signals received on the second communication channel through the main wireless signal reception path of the radio frequency processing section of the electronic device and through the diversity wireless signal reception path in the digital baseband signal processing section of the electronic device responsive to the determination that the first and second communication channels associated with the main wireless signal reception path and the diversity wireless signal reception path, respectively, have changed.

In still other embodiments, the electronic device is a mobile terminal.

In still other embodiments, a computer program product comprises a non-transitory computer readable program medium, the computer readable program medium comprises computer readable program code configured to carry out methods as described above.

In further embodiments, a method of operating an electronic device comprises providing a plurality of antenna elements, evaluating a wireless communication performance criterion to obtain a performance evaluation, and selecting a pair of the plurality of antenna elements for use in wireless communication based on the performance evaluation.

In still further embodiments, evaluating the wireless communication performance criterion comprises determining a Multiplexing Efficiency where the Multiplexing Efficiency is given by Multiplexing Efficiency=$\sqrt{(1-\rho_\in)\eta_1\eta_2}$ where $\eta_1$ and $\eta_2$ are a total efficiency of a first and a second one of the plurality of antenna elements, respectively and $\rho_\in$ is an envelope correlation coefficient between the first and second one of the plurality of antenna elements.

In still further embodiments, evaluating the wireless communication performance criterion comprises determining a Normalized Multiplexing Efficiency where the Normalized Multiplexing Efficiency is given by Normalized Multiplexing Efficiency=Multiplexing Efficiency in Free Space−Multiplexing Efficiency in a User Application.

In still further embodiments, the electronic device is a mobile terminal.

In still further embodiments, a computer program product comprises a non-transitory computer readable program medium, the computer readable program medium comprises computer readable program code configured to carry out methods as described above.

In other embodiments, an electronic device comprises a plurality of antenna elements and antenna selection control circuitry that is configured to evaluate a wireless communication performance criterion to obtain a performance evaluation and assign a first one of the plurality of antenna elements to a main wireless signal reception and transmission path and a second one of the plurality of antenna elements to a diversity wireless signal reception path based on the performance evaluation.

In still other embodiments, the antenna selection control circuitry is configured to evaluate the wireless communication performance criterion by determining transmission power for signals transmitted through each of the plurality of antenna elements and power associated with signals reflected back through each of the plurality of antenna elements.

In still other embodiments, the antenna selection control circuitry is configured to evaluate the wireless communication performance criterion by determining Received Signal Strength Indication (RSSI) data for each of the plurality of antenna elements.

In still other embodiments, the antenna selection control circuitry is configured to evaluate the wireless communication performance criterion by processing feedback from a wireless basestation, the feedback including signal strength information for signals transmitted from each of the plurality of antenna elements.

In still other embodiments, the antenna selection control circuitry is configured to evaluate the wireless communication performance criterion by determining proximity information of structure abutting the mobile terminal via at least one sensor.

In still other embodiments, the electronic device is a mobile terminal.

In further embodiments of the present invention, an electronic device comprises a plurality of antenna elements and antenna selection control circuitry that is configured to evaluate a wireless communication performance criterion to obtain a performance evaluation and select a pair of the plurality of antenna elements for use in wireless communication based on the performance evaluation.

In still further embodiments, the antenna selection control circuitry is configured to evaluate the wireless communication performance criterion by determining a Multiplexing Efficiency where the Multiplexing Efficiency is given by Multiplexing Efficiency=$\sqrt{(1-\rho_\in)\eta_1\eta_2}$ where $\eta_1$ and $\eta_2$ are a total efficiency of a first and a second one of the plurality of antenna elements, respectively and $\rho_\in$ is an envelope correlation coefficient between the first and second one of the plurality of antenna elements.

In still further embodiments, the electronic device is a mobile terminal.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1A:
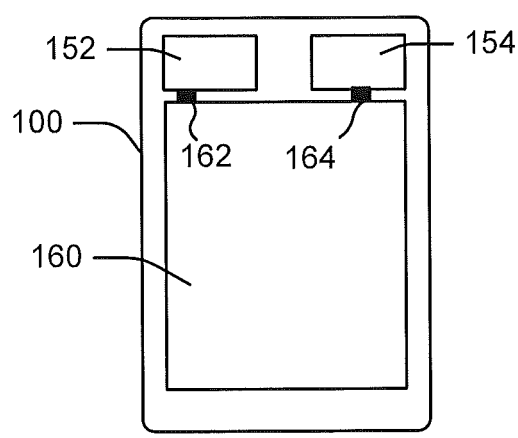
FIGS. 1A and 1B are diagrams of a mobile terminal that includes a Multiple Input-Multiple Output (MIMO) antenna array in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "signal" may take the form of a continuous waveform and/or discrete value(s), such as digital value(s) in a memory or register. As used herein, the terms "module," "circuit," and "controller" may take the form of digital circuitry, such as computer-readable program code executed by an instruction processing device(s) (e.g., general purpose microprocessor and/or digital signal processor), and/or analog circuitry.

It will be understood that embodiments of the invention may be implemented in an electronic device, such as a mobile terminal, that includes a Multiple-Input Multiple-Output (MIMO) antenna that is configured to transmit and receive RF signals in two or more frequency bands. The MIMO antenna may be configured, for example, to transmit/receive RF communication signals in the frequency ranges used for cellular communications (e.g., cellular voice and/or data communications), WLAN communications, and/or TransferJet communications, etc. As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

It will be understood mobile terminals according to various embodiments of the invention may operate in any type of wireless communications network. In some embodiments according to the invention, for example, the network may provide services broadly labeled as PCS (Personal Communications Services) including advanced digital cellular systems conforming to standards such as IS-136 and IS-95, lower-power systems such as DECT (Digital Enhanced Cordless Telephone), data communications services such as CDPD (Cellular Digital Packet Data), and other systems such as CDMA-2000, that are proposed using a format commonly referred to as Wideband Code Division Multiple Access (WCDMA).

Some embodiments of the present invention stem from a realization that Long Term Evolution (LTE) mobile devices may need antenna systems that cover seven frequency bands (760-800 MHz, 824-894 MHz, 880-960 MHz, 1710-1850 MHz, 1820-1990 MHz, 1920-2170 MHz, and 2500-2700 MHz. The antenna systems used in LTE devices may also need to meet the requirements of Single In-Single Output (SISO) and Single In-Multiple Output (SIMO) applications for other 3GPP and 2G bands. The antenna systems may be required to meet Specific Absorption Rate (SAR) requirements and other industry standards. To enhance the performance of such a device, an intelligent control system, according to some embodiments of the present invention, may be used to select particular antenna(s) for transmitting and receiving wireless signals based on various performance factors and criteria. In some embodiments, the antenna selection may be based on various modes of operation of the device, such as particular ways a user holds the device during operation.

Figure 1B:
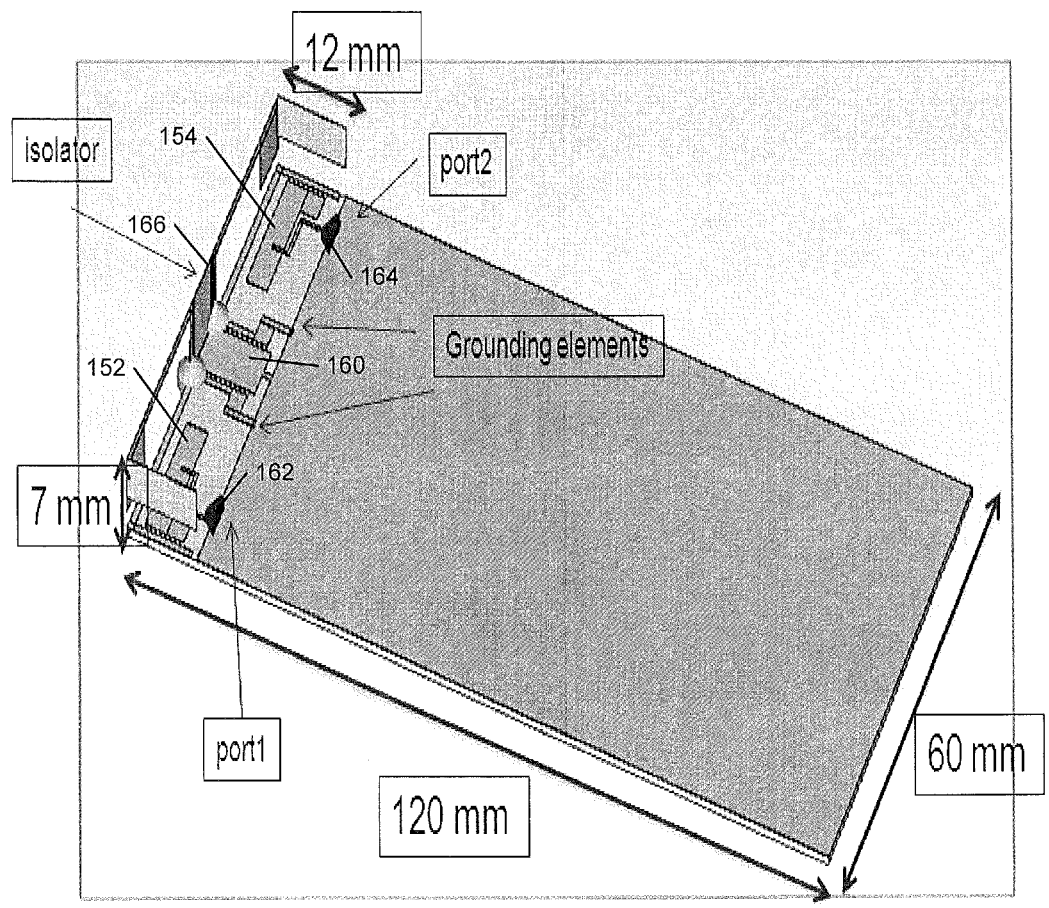

FIGS. 1A and 1B illustrate a mobile terminal 100 including a MIMO antenna that includes at least two radiating elements or antennas 152, 154. The first and second radiating elements 152, 154 may be formed on a planar substrate, such as on a conventional printed circuit board, which includes a dielectric material, ceramic material, or insulation material. The first and second radiating elements 152, 154 are adjacent to grounding elements 160, which couple the first and second radiating elements 152, 154 to a ground plane on the printed circuit board. The first and second radiating elements 152, 154 may be formed by patterning a conductive (e.g., metallization) layer on a printed circuit board. The ground plane 160 may act as a counterpoise for each of the first and second radiating elements 152, 154.

RF signals are coupled to the first radiating element 152 through a first feed element or port 162, while RF signals are coupled to the second radiating element 154 through a second feed element or port 164. The first feed element 162 is coupled to the first radiating element 152 near an end of the first radiating element 152, so that the first radiating element 152 generally extends away from the first feed element 162 along an upper end of the mobile terminal 100.

Similarly, the second feed element 164 is coupled to the second radiating element 154 near an end of the second radiating element 154, so that the second radiating element 152 generally extends away from the second feed element 164 along the upper end of the mobile terminal 100. The two radiating elements 152 and 154 are separated via an isolator element 166.

Although shown with both radiating elements or antennas 152, 154 at the same end of the mobile terminal 100, it will be understood that the radiating elements or antennas 152 and 154 may be disposed in a variety of positions in mobile terminal 100 in accordance with various embodiments of the present invention. Moreover, more than two antennas can be used in other embodiments of the present invention.

In general, the efficiency of a single antenna is increased when the antenna excites the fundamental mode of the antenna's counterpoise. However, if both antennas in a MIMO antenna excite the same mode, they will tend to experience mutual coupling. This coupling causes the signals on the antennas to become correlated, which can reduce the performance of the MIMO antenna system.

An additional complexity arises when the MIMO antennas are used in a dual band system, i.e., a system that is intended to operate over more than one frequency range. For example, in a Long Term Evolution (LTE) handset, the antenna may transmit/receive signals in both a 750 MHz band and an 850 MHz band. Within this general frequency range, the correlation of radiating elements that use the same ground plane may be unacceptably high, such as about 0.8 to 0.9.

Figure 2:
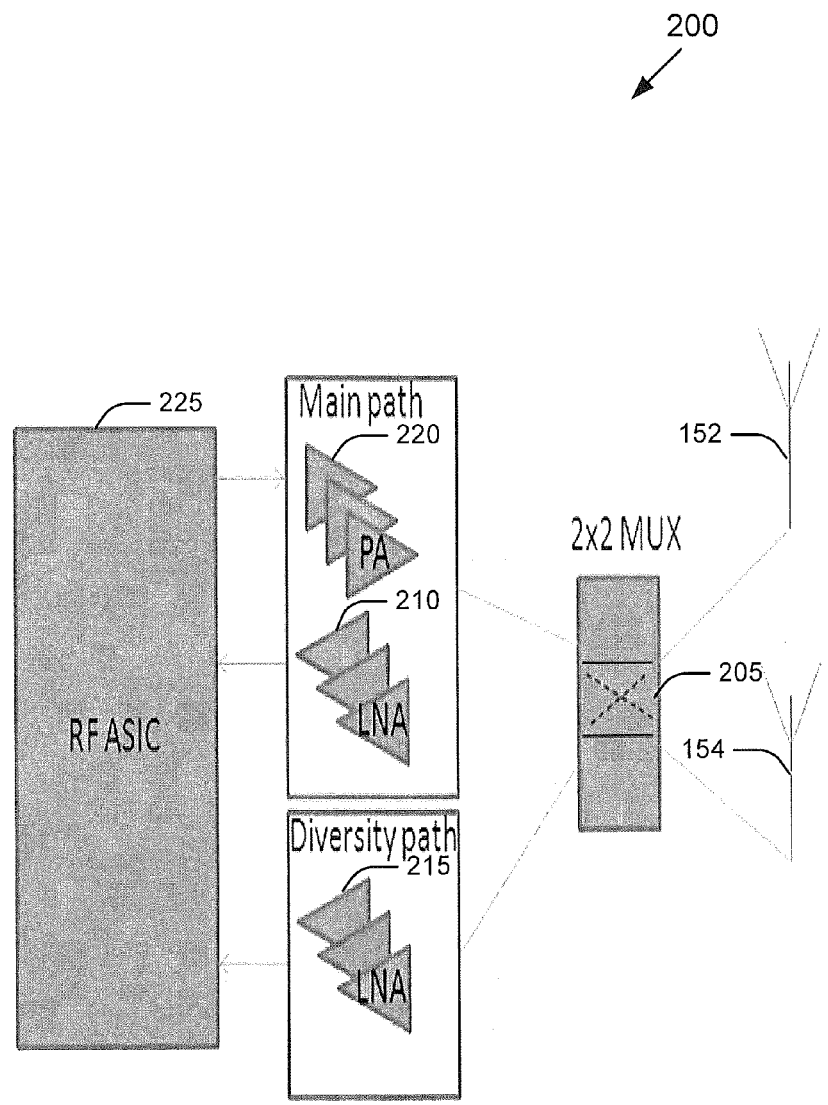
FIGS. 2-6 are block diagrams that illustrate control circuitry for selecting an antenna in a mobile terminal that includes a MIMO antenna system in accordance with various embodiments of the present invention.

FIG. 2 is a block diagram that illustrates control circuitry for selecting an antenna in a mobile terminal that includes a MIMO antenna system 200 according to some embodiments of the present invention. The MIMO antenna system 200 comprises antennas 152 and 154 that are connected to downconvertor circuitry via a multiplexer 205. The downconvertor circuitry comprises low noise amplifiers (LNAs) 210 and 215 in the main path and diversity path, respectively, along with power amplifiers (PAs) 220 in the main path. An RF ASIC 225 is coupled to the amplifier circuits 210, 215, and 220 and may be configured to implement the mixer circuits, oscillators, and input/output filters to generate the complex baseband signal from a received RF signal via antennas 152 and 154 and to generate the RF signal for transmission on one of the antennas 152 and 154 from a complex baseband signal. To enhance the performance of a mobile terminal incorporating the MIMO antenna system 200, the multiplexer 205 is operable in response to various control circuitry and signals to select one the antennas 152 and 154 for transmission and to select which of the antennas 152 and 154 is to be used for the main path signal and which is to be used for the diversity path signal when processing a received RF signal.

Figure 3:
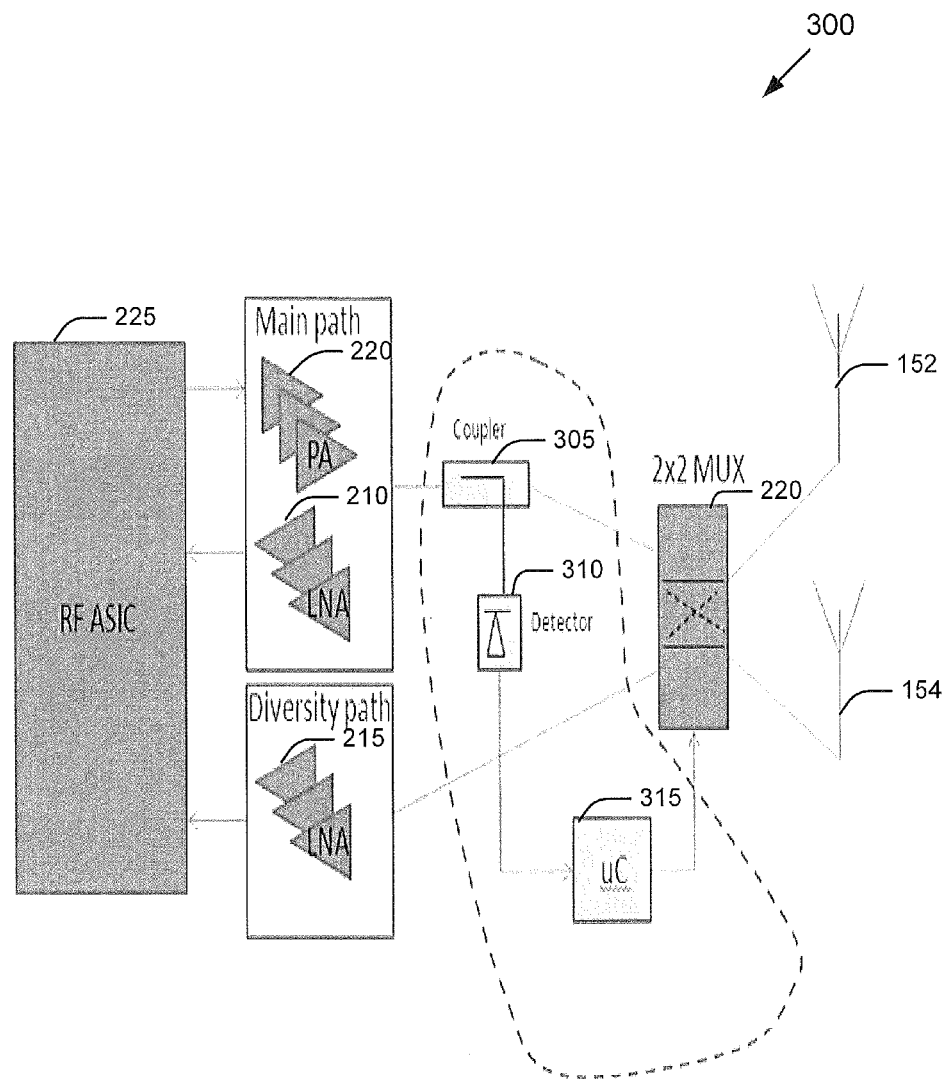

FIG. 3 is a block diagram that illustrates control circuitry for selecting an antenna in a mobile terminal that includes a MIMO antenna system 300 according to some embodiments of the present invention. The MIMO antenna system 300 is similar to that illustrated in FIG. 2, but includes a coupler 305 connected in the main path. A detector 310 and microcontroller 315 connect the coupler to the multiplexer 205. In accordance with various embodiments of the present invention, the coupler 305 can be a single directional coupler or a bi-directional coupler. The detector 310 can be implemented in a variety of different ways in accordance with various embodiments of the present invention. For example, the detector 310 may detect amplitude only or may be a complex detector capable of detecting both amplitude and phase. According to some embodiments, the detector 310 can measure power associated with transmitted signals sent through the power amplifiers 220 via each antenna 152 and 154 along with the power associated with signals reflected back through the two antennas 152 and 154. Based on these measurements, the microcontroller 315 can select which of the two antennas 152 and 154 to use for transmission. Once an antenna is selected for transmission, the microcontroller 315 may at certain times, such as on a periodic schedule and/or if performance degrades below some threshold level, switch which antenna is used for transmission to collect additional signal transmission power and signal reflection power data to determine if the current antenna is still the preferred choice. In the embodiments of FIG. 3, however, the effects of absorption loss may not be considered, which may be dominant for some antenna types and/or conditions.

Figure 4:
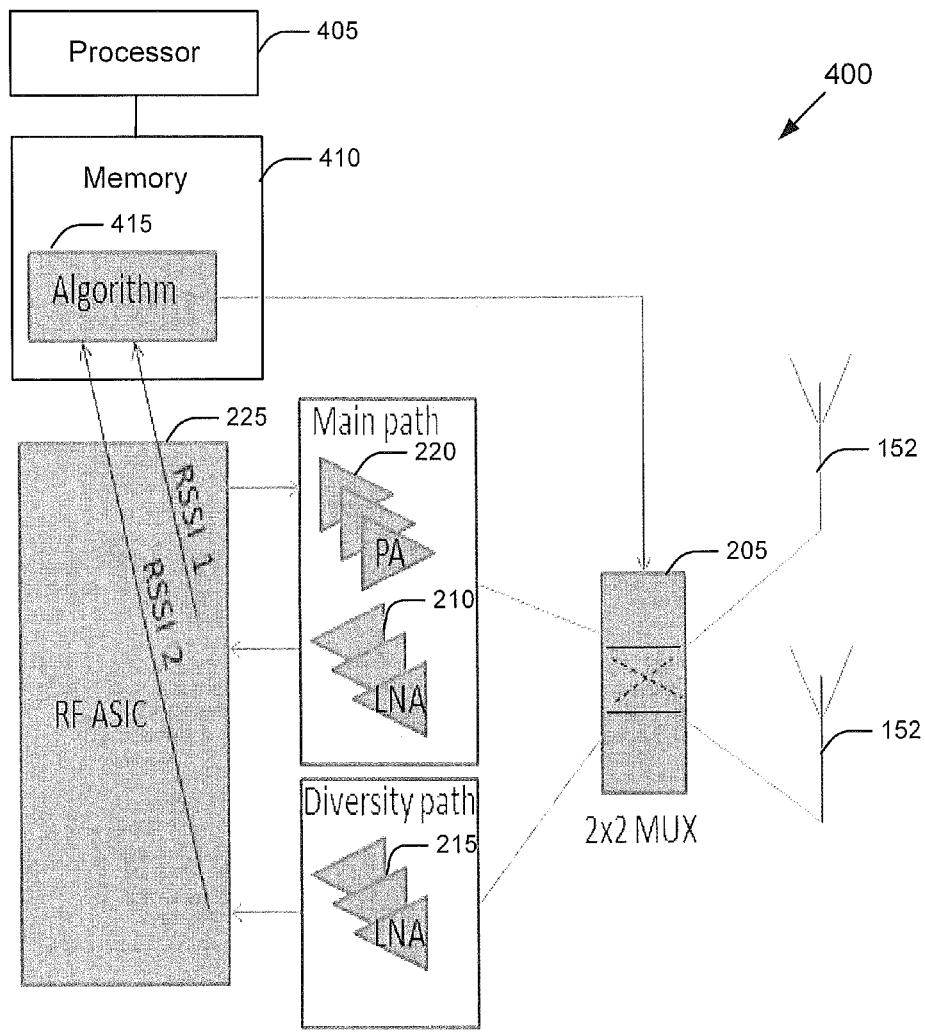

FIG. 4 is a block diagram that illustrates control circuitry for selecting an antenna in a mobile terminal that includes a MIMO antenna system 400 according to some embodiments of the present invention. The MIMO antenna system 400 is similar to that illustrated in FIG. 2, but includes a processor 405 coupled to a memory 410 that includes a Received Signal Strength Indication (RSSI) antenna selection module 415. According to some embodiments, the RF ASIC 225 provides RSSI data, which is processed using the antenna selection module 415. The RSSI data may be collected for both antennas 152 and 154 (i.e., both the main and diversity paths) and the RSSI antenna selection module 415 may determine which antenna provides signals with the higher RSSI power values. The multiplexer 205 may then be used to assign the antenna with the best RSSI power value to the main path in response to a signal from the processor 405. In the embodiments of FIG. 4, the selection of which antenna to assign to the main path and which to assign to the diversity path is based solely on the performance in the frequency bands involved in signal reception. This may not be a disadvantage, however, in systems where the correlation between the receive and transmit frequency performance is high.

Figure 5:
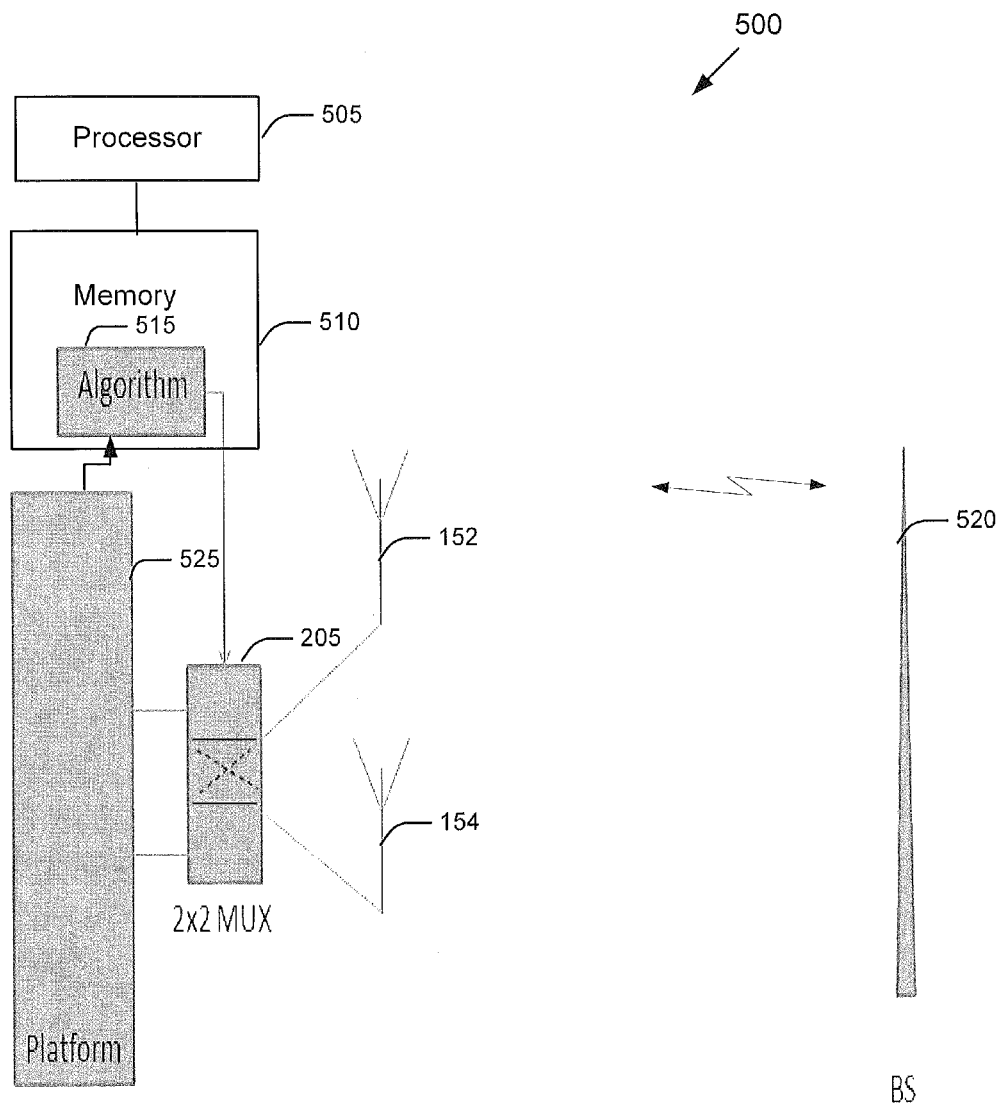

FIG. 5 is a block diagram that illustrates control circuitry for selecting an antenna in a mobile terminal that includes a MIMO antenna system 500 according to some embodiments of the present invention. The MIMO antenna system 500 is similar to that illustrated in FIG. 2, but includes a processor 505 coupled to a memory 510 that includes a base station feedback antenna selection module 515. According to some embodiments, the radio frequency signal processing platform 525 provides feedback information from the base station 520 with regard to signal strength received from the device, which is processed using the base station feedback antenna selection module 515. The radio frequency processing platform 525 may include such functionality as the main and diversity path amplifiers 220, 210, and 215 along with the RF ASIC 225 described above. The base station signal strength feedback data may be collected for both antennas 152 and 154 and the base station feedback antenna selection module 515 may determine which antenna transmits signals with the higher power values. The multiplexer 205 may then be used to assign the antenna with the best transmit power values based on the base station feedback to the main path in response to a signal from the processor 505. In the embodiments of FIG. 5, the base station feedback antenna selection module 515 may at certain times, such as on a periodic schedule or if performance degrades below some threshold level, switch which antenna is used for transmission to collect feedback from the base station 520 with respect to the transmitted signal strength.

Figure 6:
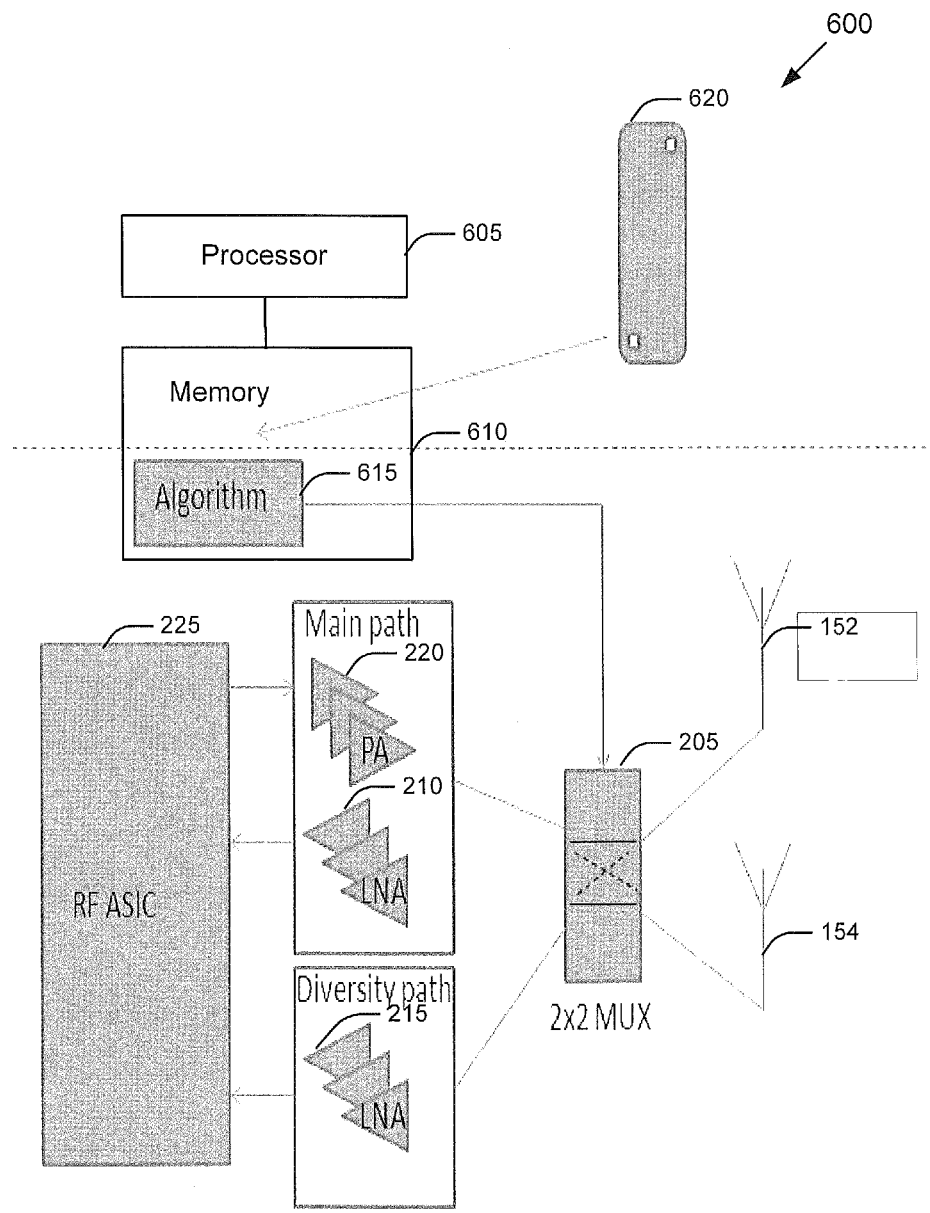

FIG. 6 is a block diagram that illustrates control circuitry for selecting an antenna in a mobile terminal that includes a MIMO antenna system 600 according to some embodiments of the present invention. The MIMO antenna system 600 is similar to that illustrated in FIG. 2, but includes a processor 605 coupled to a memory 610 that includes a proximity sensor antenna selection module 615. According to some embodiments, one or more proximity sensors 620 may detect placement of a user's hand on the device or some other external object that may affect operation of the antennas 152 and 154. The proximity information captured by the proximity sensors 620 is processed using the proximity sensor antenna selection module 515. Based on the proximity of outside structure, such as a user's hand, to the antennas 152 and 154, the proximity sensor antenna selection module 615 may determine which antenna is preferred for transmission and/or receiving based on the likelihood of reduced interference by the proximity of the antenna to outside structure. The multiplexer 205 may then be used to assign the antenna with that has the least interference from external structure based on the proximity sensor 620 data to the main path in response to a signal from the processor 605. In other embodiments, orientation circuitry may be used in place of or in addition to the proximity sensors 620 to determine the particular orientation of the device. Such orientation information may also be processed using the proximity sensor antenna selection module 615 to determine which antenna is preferred for transmission and/or receiving based on the likelihood of reduced interference as compared to the other antenna based on the orientation of the device.

Figure 7:
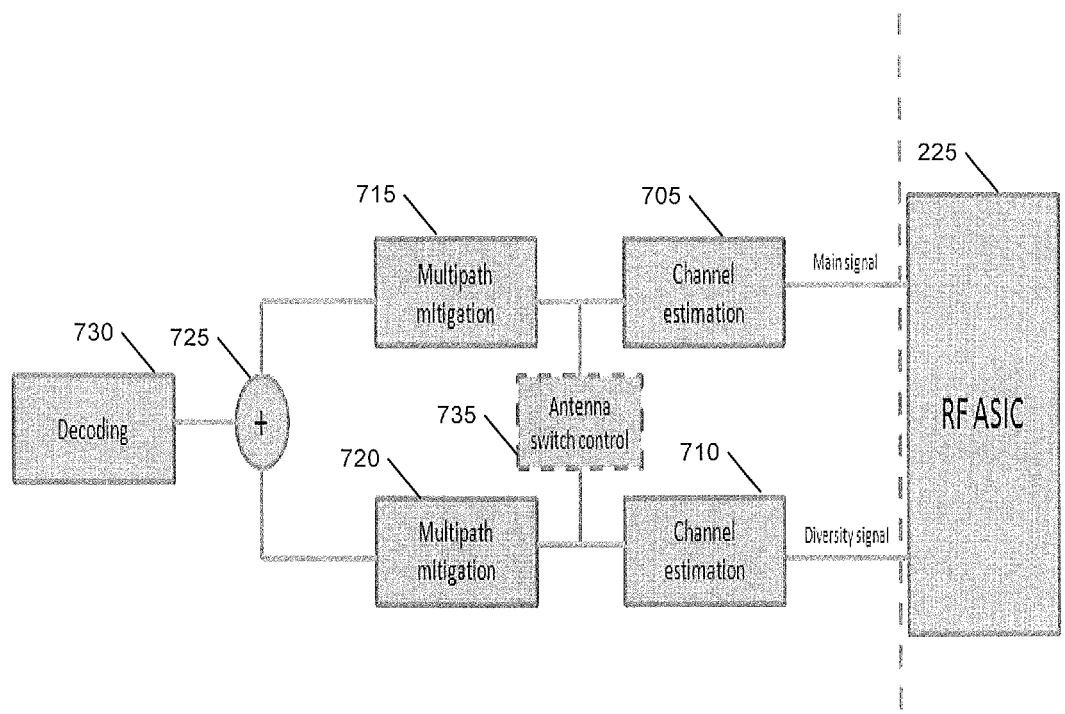
FIG. 7 is a block diagram of digital baseband processing circuitry for a mobile terminal that includes a MIMO antenna system in accordance with some embodiments of the present invention.

FIG. 7 is a block diagram of digital baseband processing circuitry 700 for a mobile terminal that includes a MIMO antenna system according to some embodiments of the present invention. As described above with respect to some embodiments of the present invention, to enhance the performance of a mobile terminal, an intelligent control system may be used to select particular antenna(s) for transmitting and receiving wireless signals based on various performance factors and criteria. Such dynamic selection, however, may impact decoding of the received wireless signals in the digital baseband.

A typical signal received by mobile terminal will have been affected by multipath fading. To compensate for the effects of multipath fading and other undesirable effects of the communication medium, such as noise, the receiver circuitry uses channel estimation algorithms to model the channel state information or channel properties of the communication link. The modeling may include an estimation of the transfer function and noise associated with the communication link.

Dynamic antenna selection in accordance with the embodiments described above, however, may affect the signal processing performed in the digital baseband portion of the receiver architecture, however. Referring to FIG. 7, the RF ASIC outputs the complex baseband signals for the main path and the diversity path. The digital baseband processing circuitry 700 includes channel estimation modules 705 and 710 for the main and diversity signal paths, respectively. The channel estimation modules 705, 710 are configured to filter the received main and diversity signals based on a statistical modeling of the main and diversity signal paths. Multipath mitigation modules 715 and 720 are used to compensate for the effects of multipath fading, for example. The multipath mitigation modules 715 and 720 may implement any multipath mitigation algorithm used and the signals from the main signal path and diversity signal path are coherently combined at the adder 725. The output of the adder 725 is provided to a decoding module 730 to extract the symbol information from the baseband signal.

As described above, intelligent control systems may dynamically switch which antenna is used for main signal path reception and which antenna is used for diversity signal path reception in a MIMO antenna system. Such switching of antennas, however, changes the communication channel used for the main and diversity signal paths as well. As a result, the channel estimation filters and multipath mitigation algorithms are set up for the wrong communication channels. According to some embodiments of the present invention, an antenna switch control module 735 is used to update the channel estimation modules 705 and 710 so as to reconfigure the filters to model the appropriate communication link. Similarly, the antenna switch control module 735 updates the multipath mitigation modules 715 and 720 to model the appropriate communication link. In the present example where only two antennas are used, the channel estimation models uses in the channel estimation modules 705 and 710 are swapped and the multipath mitigation models used in the multipath mitigation modules 715 and 720 are swapped.

Figure 8:
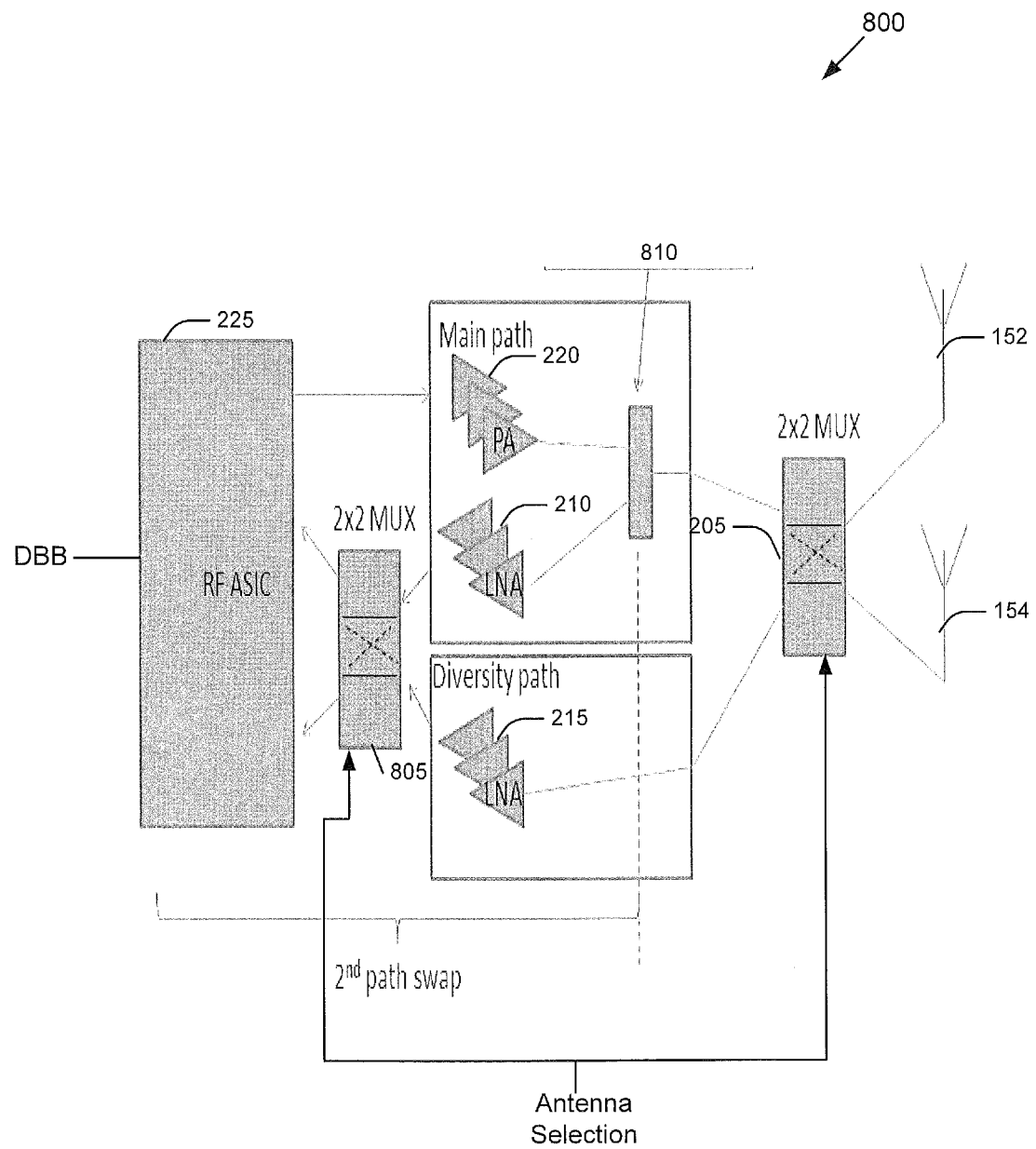
FIG. 8 is a block diagram that illustrates control circuitry for selecting an antenna in a mobile terminal that includes a MIMO antenna system in accordance with further embodiments of the present invention.

FIG. 8 is a block diagram that illustrates control circuitry for selecting an antenna in a mobile terminal that includes a MIMO antenna system 800 according to some embodiments of the present invention. The MIMO antenna system 800 is similar to that illustrated in FIG. 2, but includes a second multiplexer 805 that is responsive to an antenna control signal for selecting which antennas 152, 154 to use for the main and diversity signal paths. According to some embodiments of the present invention, once the channel estimation modules 705, 710 and/or multipath mitigation modules 715, 720 have been configured for the respective main and diversity communication links when the antennas 152, 154 are swapped in response to an antenna selection signal as described above with respect to the FIGS. 2-6, the multiplexer 805 switches the signals received from the antennas 152 and 154 back to their former paths so that there is no need to change the settings in the digital baseband processing circuitry, i.e., the channel estimation modules 705, 710 and/or multipath mitigation modules 715, 720. A combiner or duplexer 810 is shown to handle the two way communication between the multiplexer 205 and the amplifiers 220 and 210. The embodiments of FIGS. 7 and 8 may allow antenna reassignments between the main and diversity paths to be conducted at any time without any loss in channel estimation and signal demodulation performance.

The embodiments of FIGS. 2-8 have been described with respect to comparing the performance of two antennas and determining which to assign to a main demodulation path and which to assign to a diversity demodulation path. Some mobile terminals, however, may include a quad-element LTE MIMO antenna array. In some applications only the optimal two antenna elements of the four are selected for operation with the other two antenna elements being disabled. As the antenna elements are typically spread out in the mobile terminal, the two antenna elements providing the best performance may vary depending on, for example, user effects or other external obstructions affecting signal reception.

Figure 9:
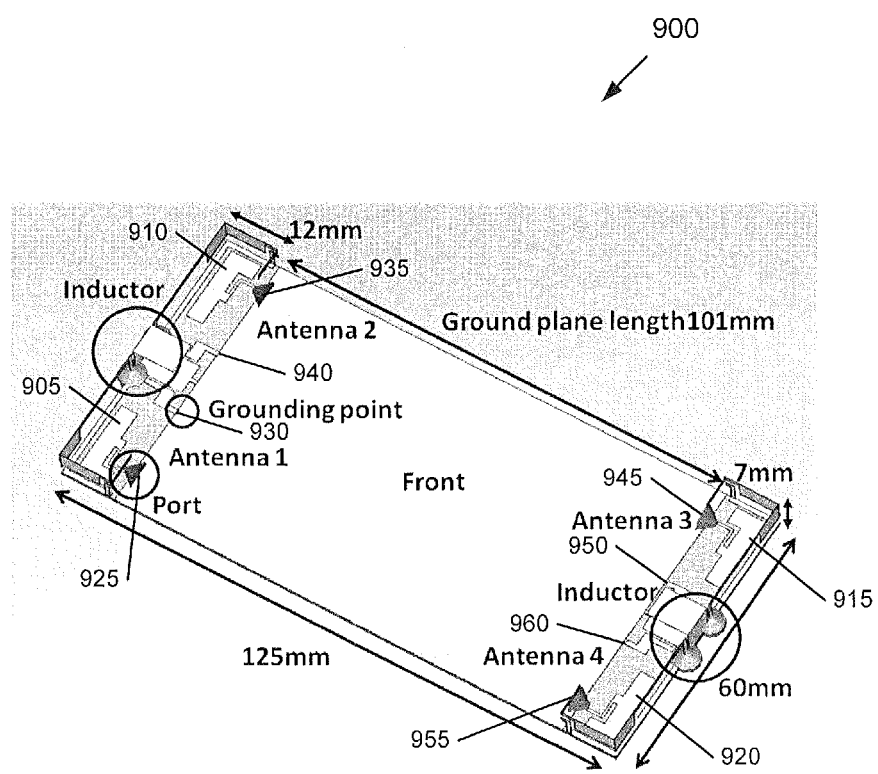
FIG. 9 is a schematic of a mobile terminal that includes a quad element MIMO antenna array according to some embodiments of the present invention.
Figure 10A:
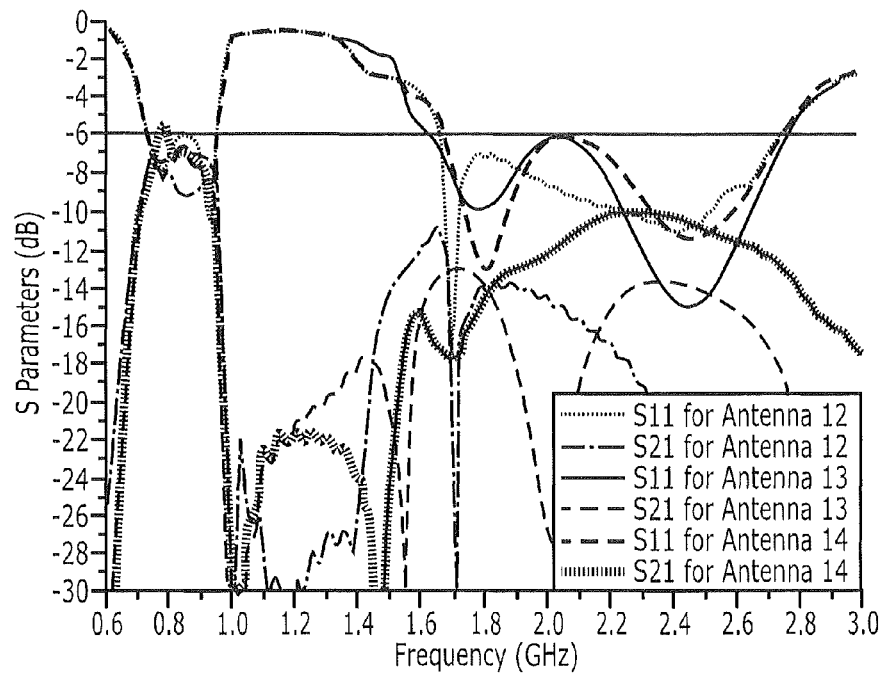
FIGS. 10A-10D are graphs of performance parameters for the mobile terminal of FIG. 9.
Figure 10B:
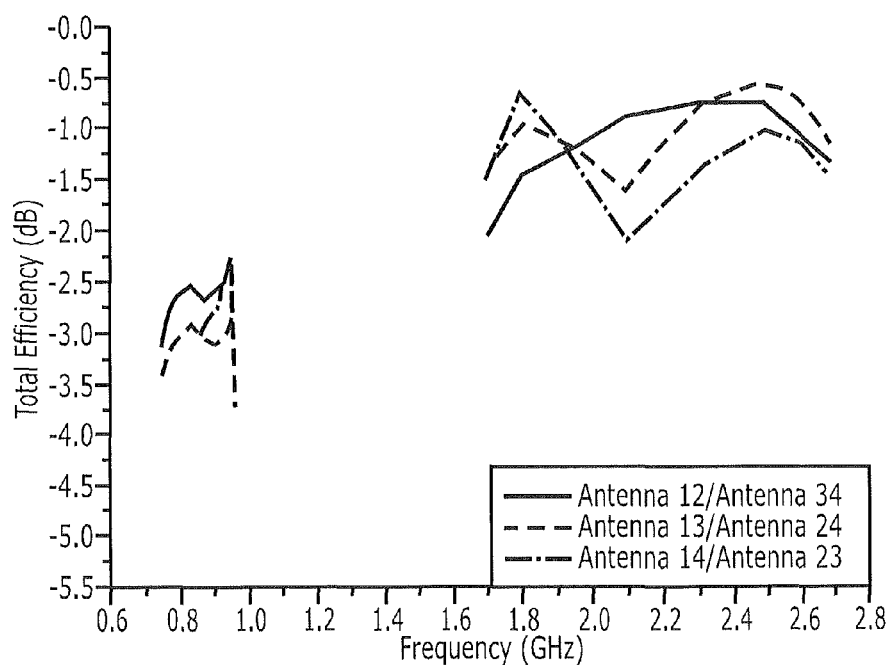
Figure 10C:
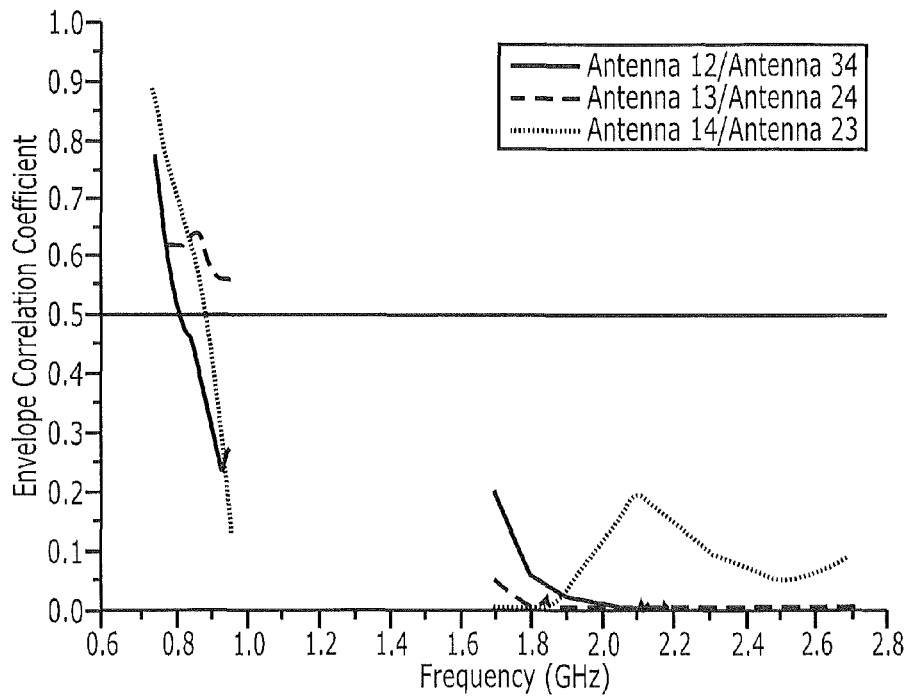
Figure 10D:
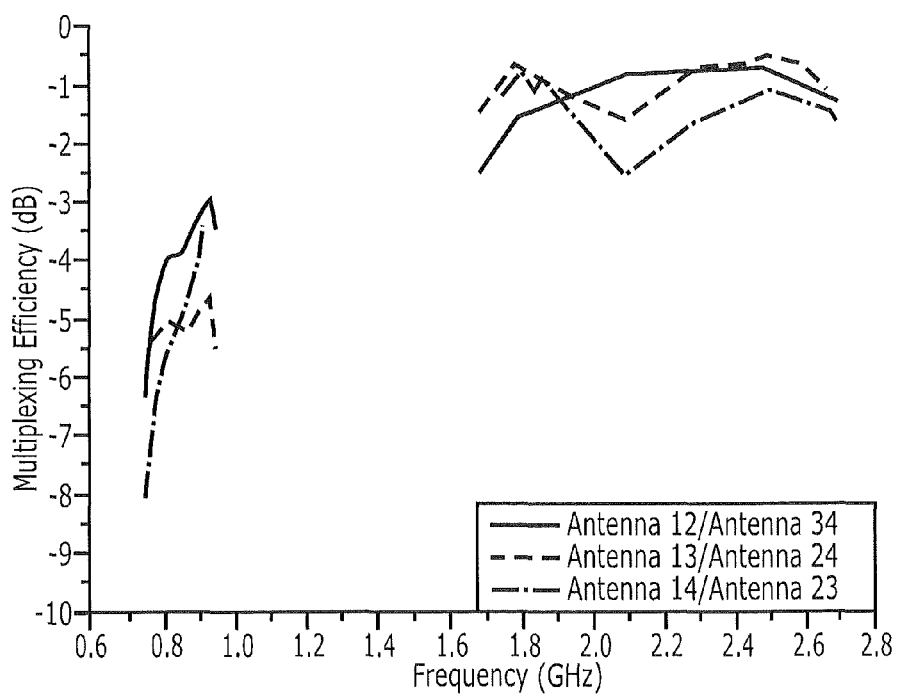

FIG. 9 illustrates a mobile terminal 900 including a quad element MIMO antenna array comprising radiating elements or antennas 1-4 905, 910, 915, and 920 configured as shown. Antenna element 1 905 includes port 925 and grounding port 930; antenna element 2 910 includes port 935 and grounding port 940; antenna element 3 905 includes port 945 and grounding port 950; and antenna element 4 920 includes port 955 and grounding port 960. For ease of description, antenna ij represents antenna i and antenna j operating with the other two antenna elements being operationally disabled via leaving their ports and grounding ports open.

According to some embodiments of the present invention, the performance of a particular antenna pairing in a quad element MIMO antenna array may be represented by a parameter called multiplexing efficiency. Multiplexing efficiency estimates MIMO channel performance through the efficiency and envelope correlation coefficient between the two antenna elements. Multiplexing efficiency is expressed as follows:

$$\text{Multiplexing Efficiency} = \sqrt{(1-\rho_\in)\eta_1\eta_2}$$

where $\eta_1$ and $\eta_2$ are the total efficiency of the first and the second MIMO antenna element, respectively. $\rho_\in$ is the envelope correlation coefficient between two elements.

The s parameters, total efficiency, envelope correlation coefficients, and multiplexing efficiency, of the different dual-element combinations in the adaptive quad-element LTE MIMO antenna array 900 of FIG. 9 are shown in FIGS. 10A-10D, respectively. It can be observed that each combination can cover the bands of 750-960 MHz and 1700-2700 MHz with a high efficiency and multiplexing efficiency.

Figure 11A:
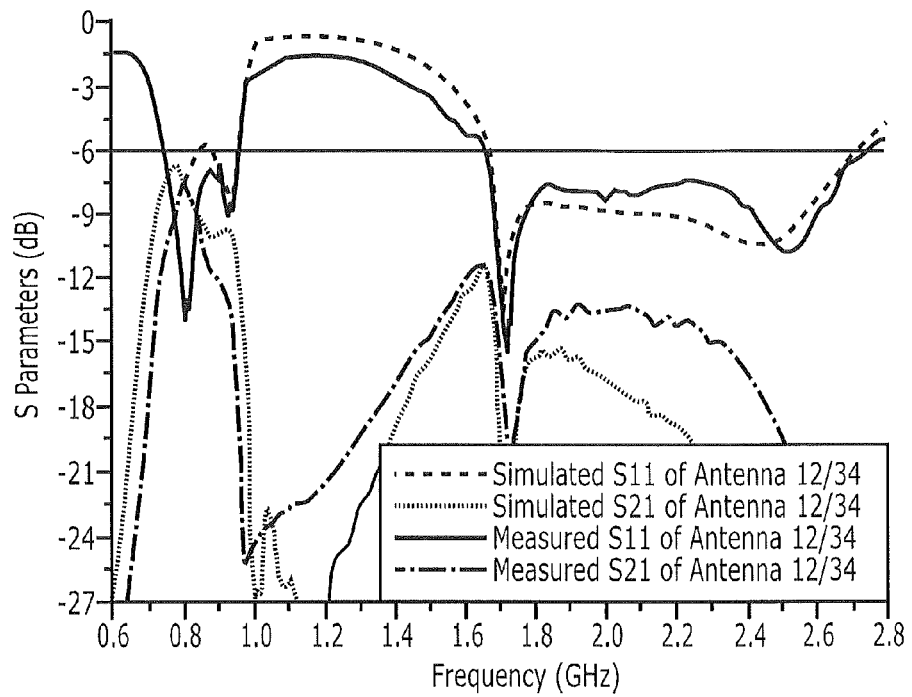
FIGS. 11A-11C are graphs of simulations and measured performance parameters for the mobile terminal of FIG. 9.
Figure 11B:
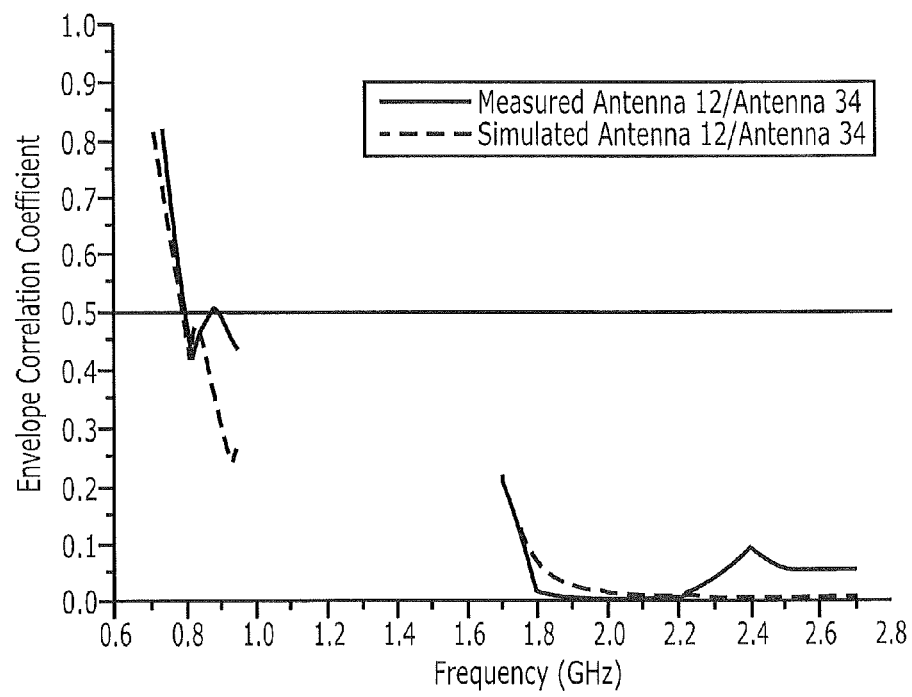
Figure 11C:
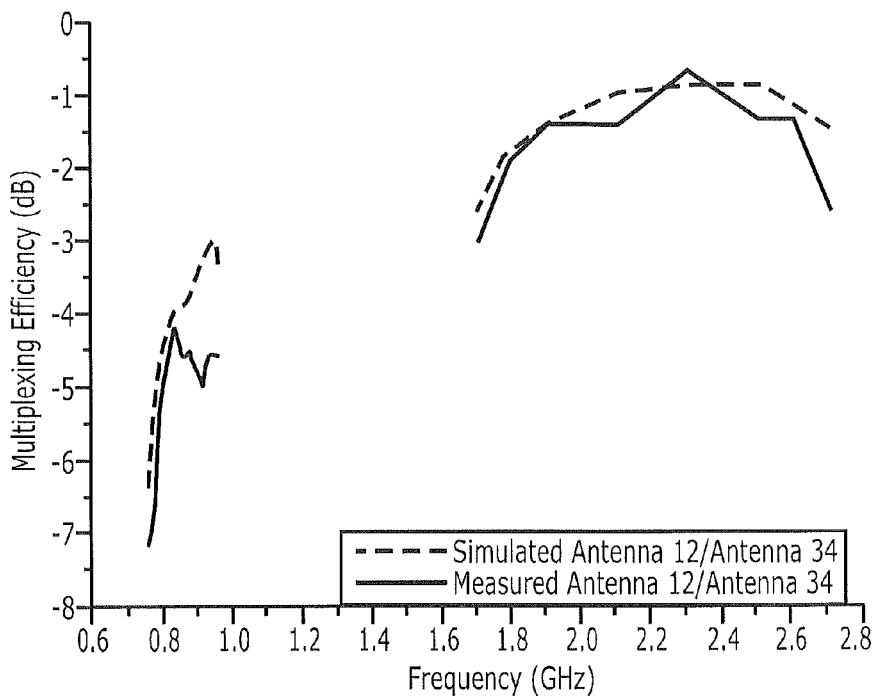

FIGS. 11A-11C show the comparisons between the simulated and measured s parameters, envelope correlation coefficient, multiplexing efficiency, of antenna 12 and antenna 34 in the quad-element array.

Figure 12:
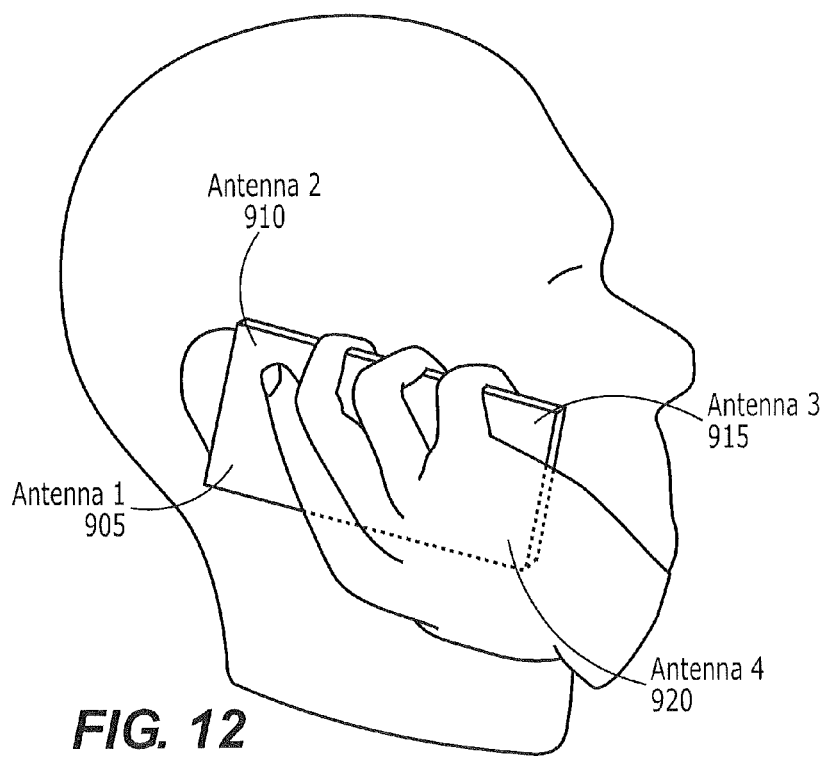
FIG. 12 is a diagram that illustrates the mobile terminal of FIG. 9 in a talk mode orientation.

Examples of the mobile terminal 900 placed in various user orientations and the performance of various antenna element pairings of the quad element MIMO antenna array will now be described. FIG. 12 illustrates the mobile terminal 900 held in a user's hand with the speaker pressed up against the user's ear. In this orientation the mobile terminal 900 may be considered to be in talk mode.

Figure 13A:
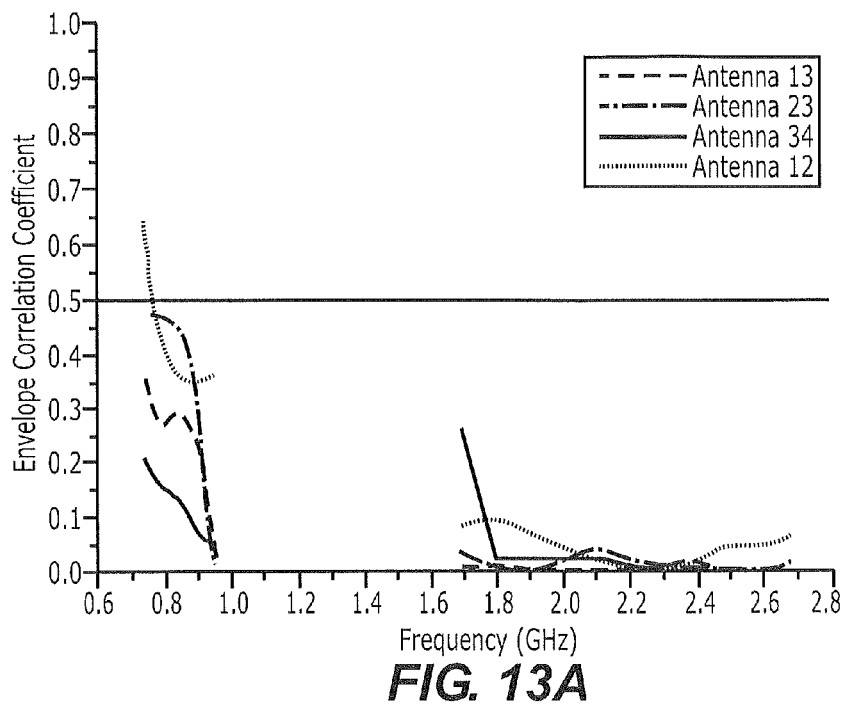
FIGS. 13A, 13B, 14A, and 14B are graphs of performance parameters for the mobile terminal of FIG. 9 in the talk mode orientation of FIG. 12.

FIG. 13A illustrates the envelope correlation coefficient for the various antenna pairings with the mobile terminal 900 in the orientation of FIG. 12. The correlation of antenna 34 in low frequency has been reduced much more efficiently than the other combinations. For the antenna 34 case, it has two characteristics: large human body coverage of the whole dual-element antenna array and human a hand placed approximately symmetrically between two ports. When the dual-element array satisfies these two characteristics the user hand can be viewed as a scatter causing structure. This scatter may efficiently separate the radiation patterns of the two MIMO antenna elements to achieve a low correlation.

Figure 13B:
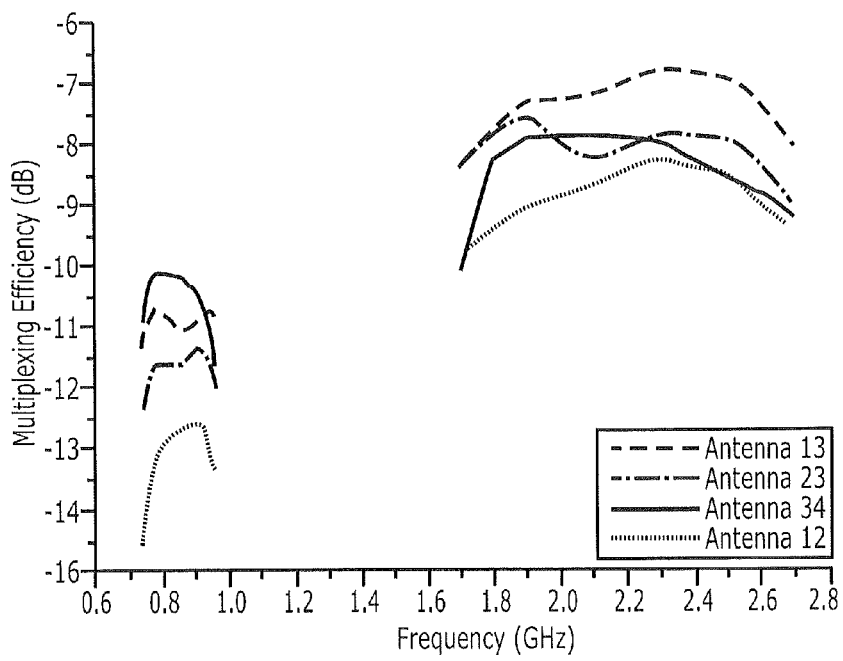

The multiplexing efficiency of the different dual-element combinations for the talk mode orientation of FIG. 12 can be calculated and is shown in FIG. 13B. For the talk mode, low band antenna 34 can be used while in high band antenna 12 may be used.

Figure 14A:
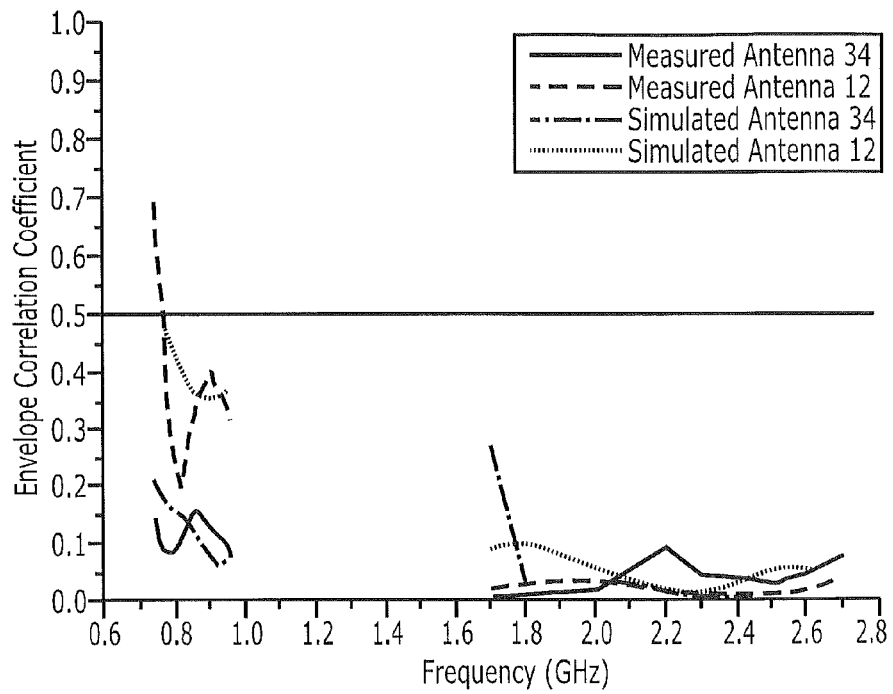
Figure 14B:
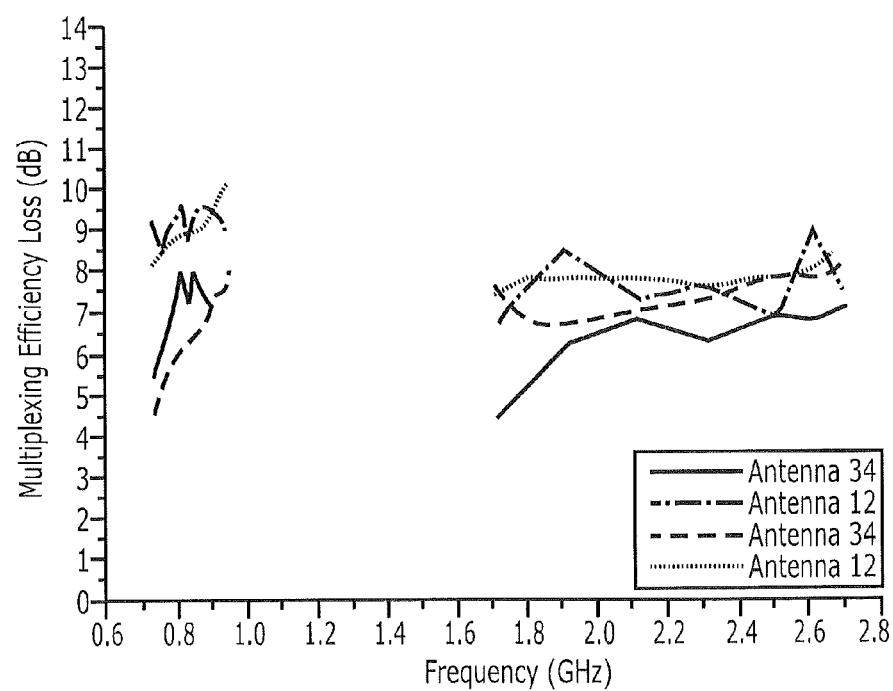

To normalize the measured multiplexing efficiency, a parameter of multiplexing efficiency loss (MEL) is used and defined as follows:

MEL=measured multiplexing efficiency in free space−
measured multiplexing efficiency in user case FIGS. 14A and 14B illustrate the simulated and measured envelope correlation coefficient and multiplexing efficiency of antenna 12 and antenna 34, respectively, for talk mode. The measured results are generally consistent with the simulations.

Figure 15:
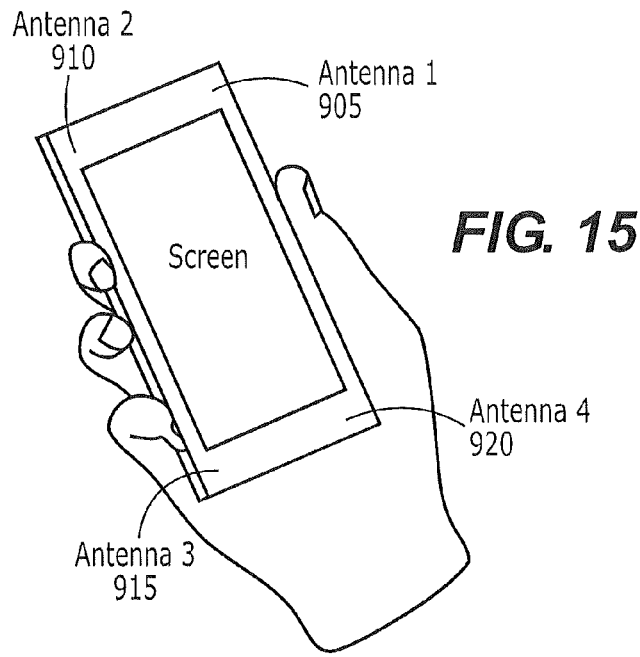
FIG. 15 is a diagram that illustrates the mobile terminal of FIG. 9 in a data mode orientation.
Figure 16A:
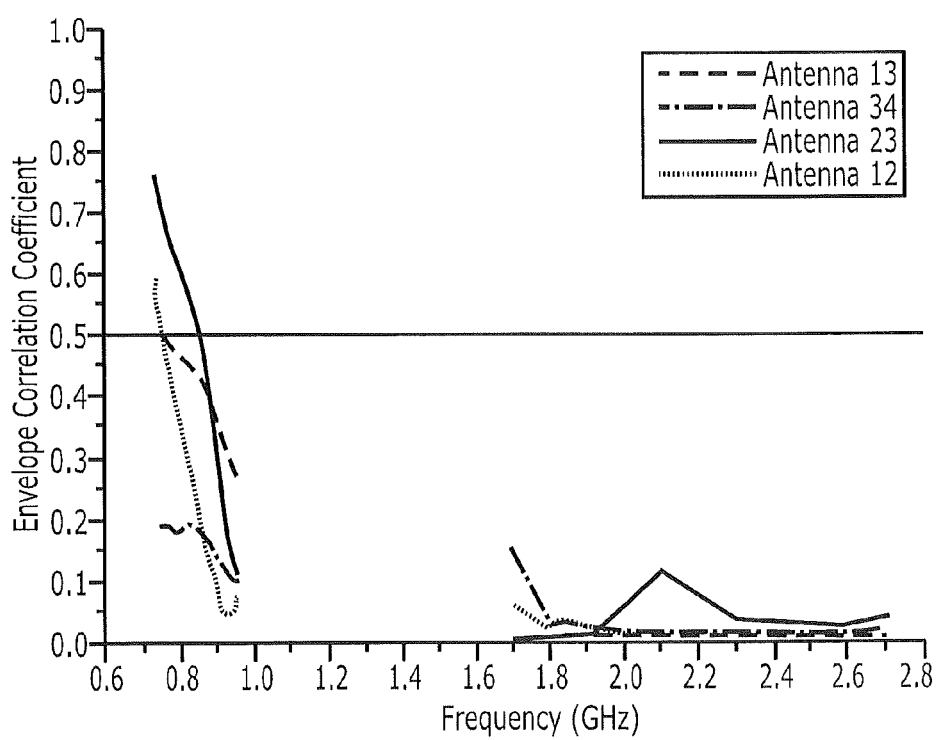
FIGS. 16A, 16B, 17A, and 17B are graphs of performance parameters for the mobile terminal of FIG. 9 in the data mode orientation of FIG. 15.
Figure 16B:
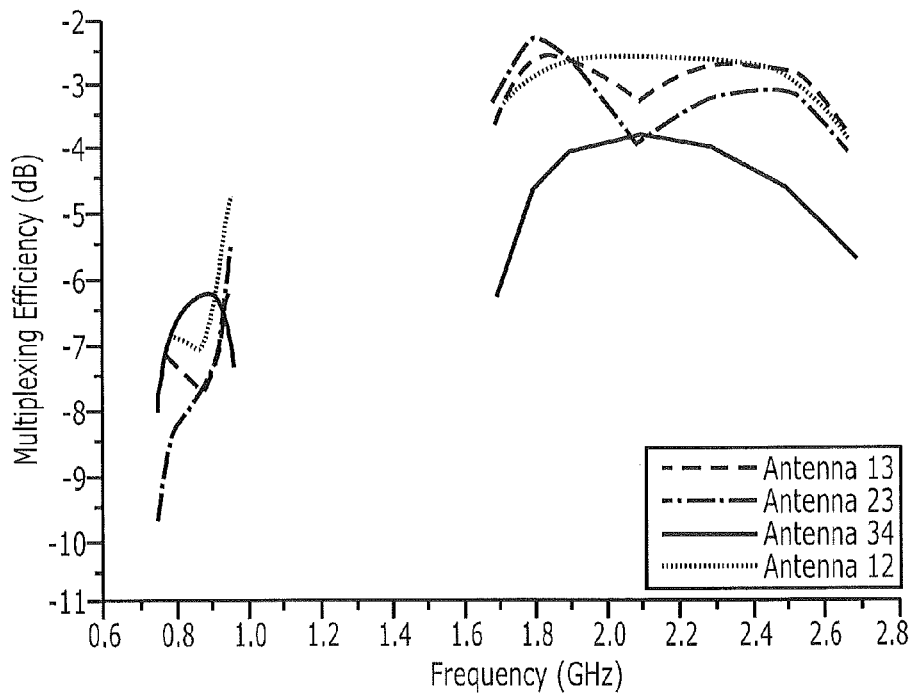

FIG. 15 illustrates the mobile terminal 900 held in a user's hand. When the mobile terminal 900 is in this orientation it may be considered to be in data mode. FIG. 16A illustrates the envelope correlation coefficient when the mobile terminal 900 is in the data mode orientation of FIG. 15. The correlation of antenna 13 also has the lowest correlation and its characteristics are the same as those for the talk mode orientation of FIG. 12. Multiplexing efficiency for the data mode orientation of FIG. 15 is illustrated in FIG. 16B. It can be observed that antenna 34 (which has the most coverage) is a little better than antenna 12 in the low band due to the lower correlation, but not so significant because of the high loss of port 955. Therefore, for the data mode, antenna 12 or antenna 34 can be used in the low band and antenna 12 can be used in the high band based on the simulations.

Figure 17A:
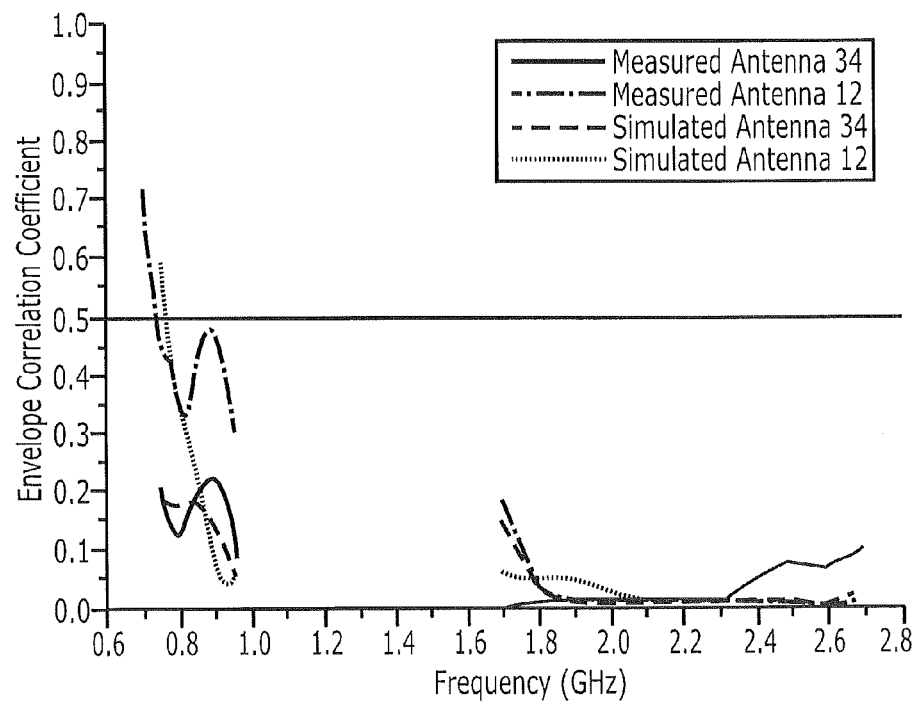
Figure 17B:
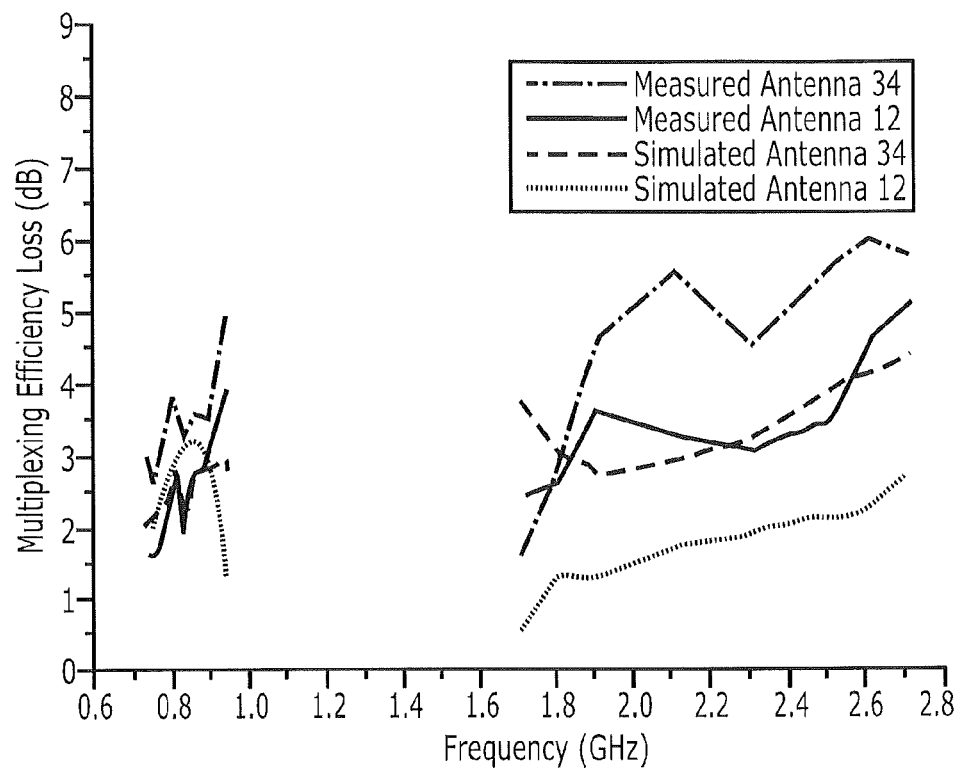

The simulated and measured envelope correlation coefficient along with the multiplexing efficiency of antenna 12 and antenna 34 when the mobile terminal 900 is in the data mode orientation are shown in FIGS. 17A and 17B, respectively. As shown in FIG. 17B, antenna 12 provides similar performance to the simulated results in the low band, but antenna 34 provides worse performance than the simulated results due to the greater losses of port 955. Antenna 12 may, therefore, be preferred to antenna 34 for low band applications. The measured losses are higher than the simulations for the high band antenna pairings, but the relative losses between antenna 12 and antenna 34 are approximately the same as the simulations. Therefore, when the mobile terminal 900 is in the data mode orientation, antenna 12 can be used in low band and in high band applications based on the measurement results.

Figure 18:
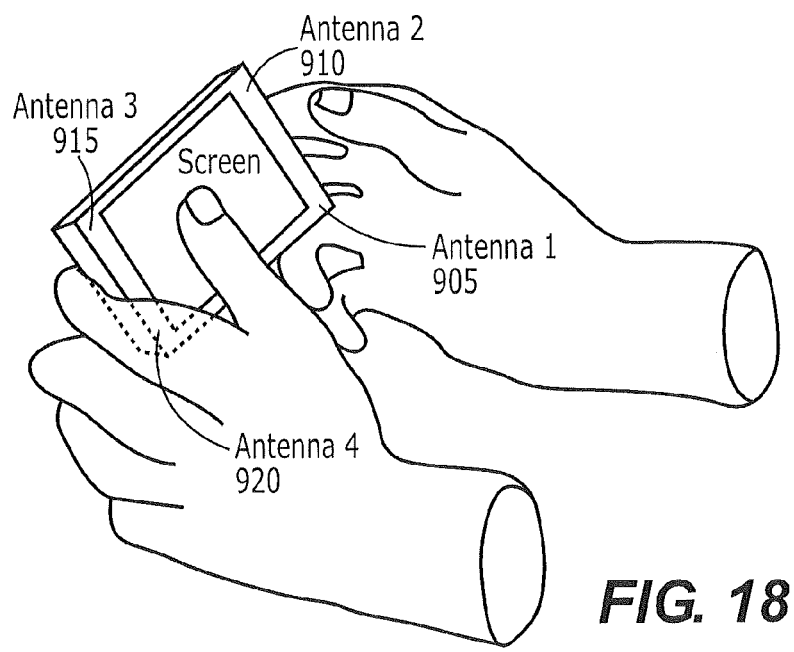
FIG. 18 is a diagram that illustrates the mobile terminal of FIG. 9 in a reading mode orientation.
Figure 19A:
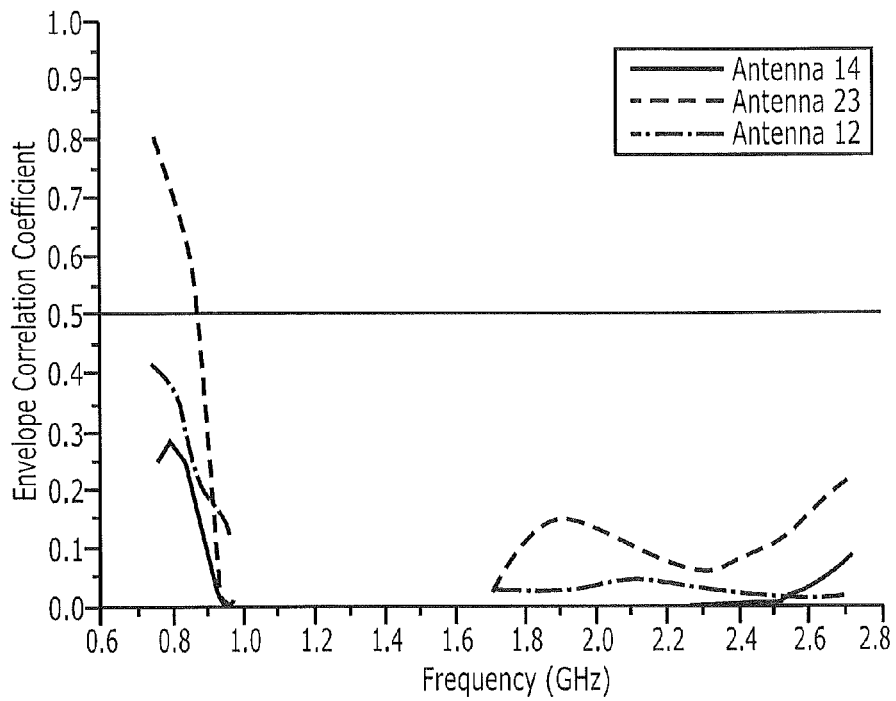
FIGS. 19A, 19B, 20A, and 20B are graphs of performance parameters for the mobile terminal of FIG. 9 in the reading mode orientation of FIG. 18.
Figure 19B:
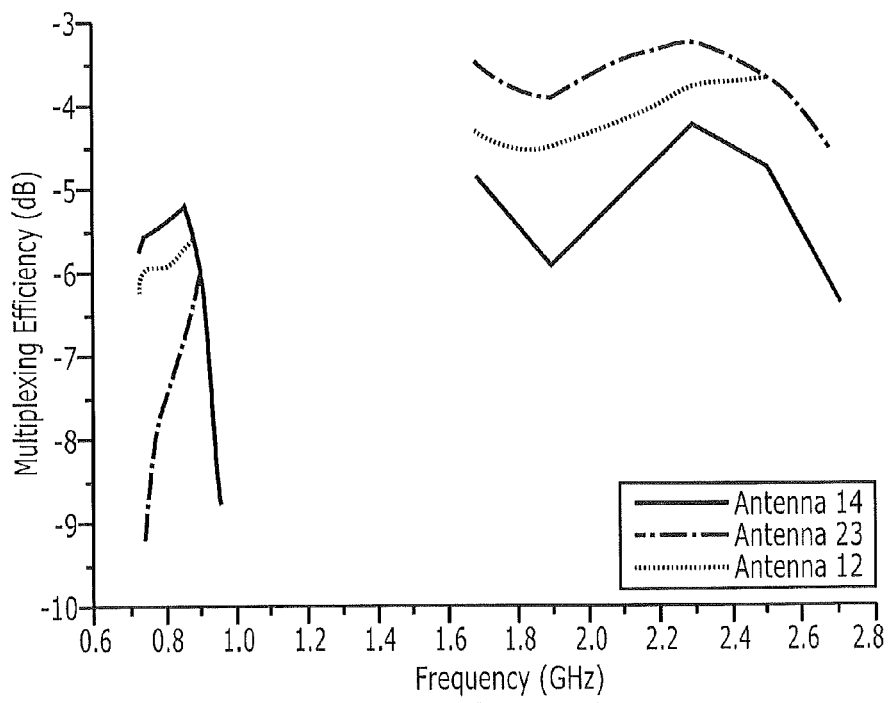

FIG. 18 illustrates the mobile terminal 900 held in a user's two hands. This orientation of the mobile terminal 900 may be called the reading mode. FIG. 19A illustrates the envelope correlation coefficient when the mobile terminal 900 is in the reading mode orientation of FIG. 18. As shown in FIG. 19A, antenna 14 has the greatest amount of coverage due to the user's hands and, therefore, has the lowest envelope correlation. Multiplexing efficiency for the reading mode orientation of FIG. 18 is illustrated in FIG. 19B. Due to the similar efficiency in the low band, the envelope correlation is the dominant factor for the high multiplexing efficiency. As a result, antenna 14 has the best multiplexing efficiency as shown in FIG. 19B. In the higher bands multiplexing efficiency may be important because of the similar envelope correlations. Therefore, when the mobile terminal 900 is in reading mode, antenna 14 may be used for low band applications and antenna 23 may be used for high band applications.

Figure 20A:
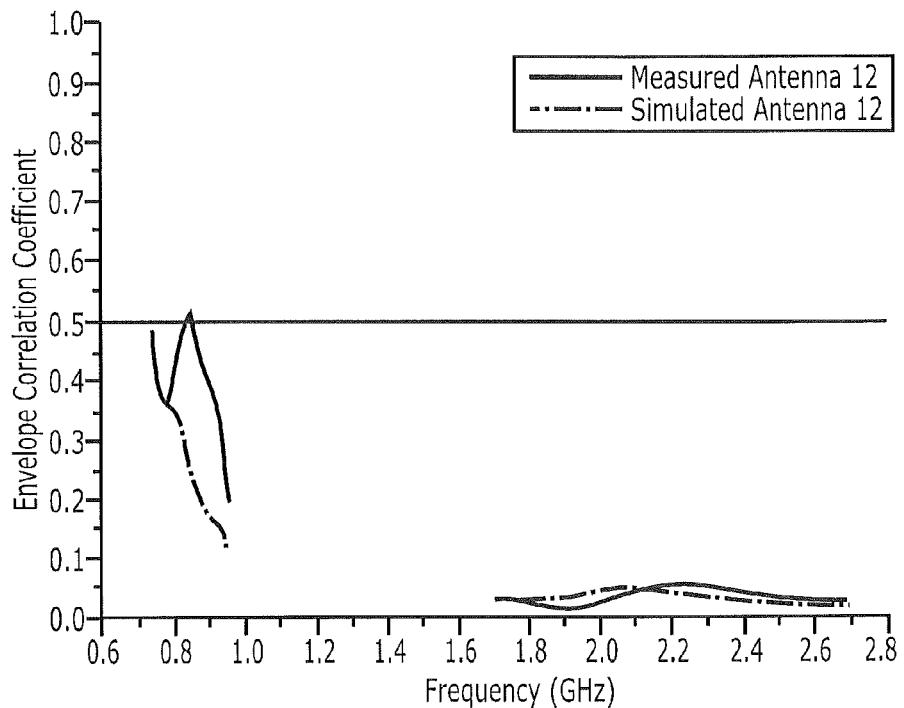
Figure 20B:
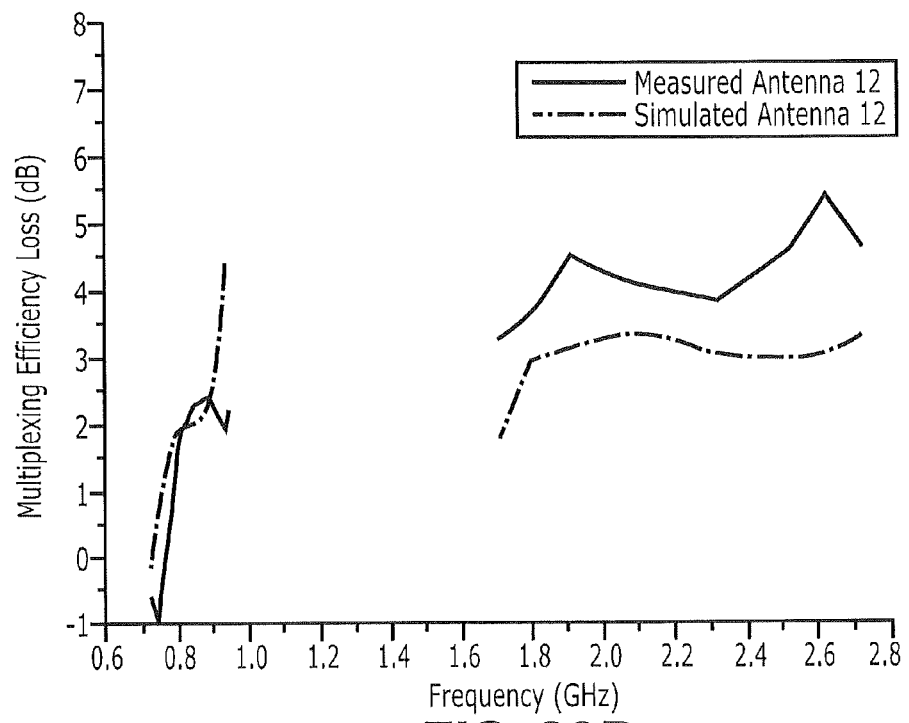

The simulated and measured envelope correlation coefficient along with the multiplexing efficiency of antenna 12 when the mobile terminal 900 is in the reading mode orientation are shown in FIGS. 20A and 20B, respectively. As can be seen in FIGS. 20A and 20B, the measured results generally agree with the simulations.

Based on the simulations and measured results from the embodiments of FIGS. 12-20, for low band applications, antenna 34, antenna 12, and antenna 14 can be used when the mobile terminal 900 is in talk mode, data mode, and reading mode, respectively. For high band applications, antenna 13, antenna 12, and antenna 23 can be used when the mobile terminal 900 is in talk mode, data mode, and reading mode, respectively.

Figure 21:
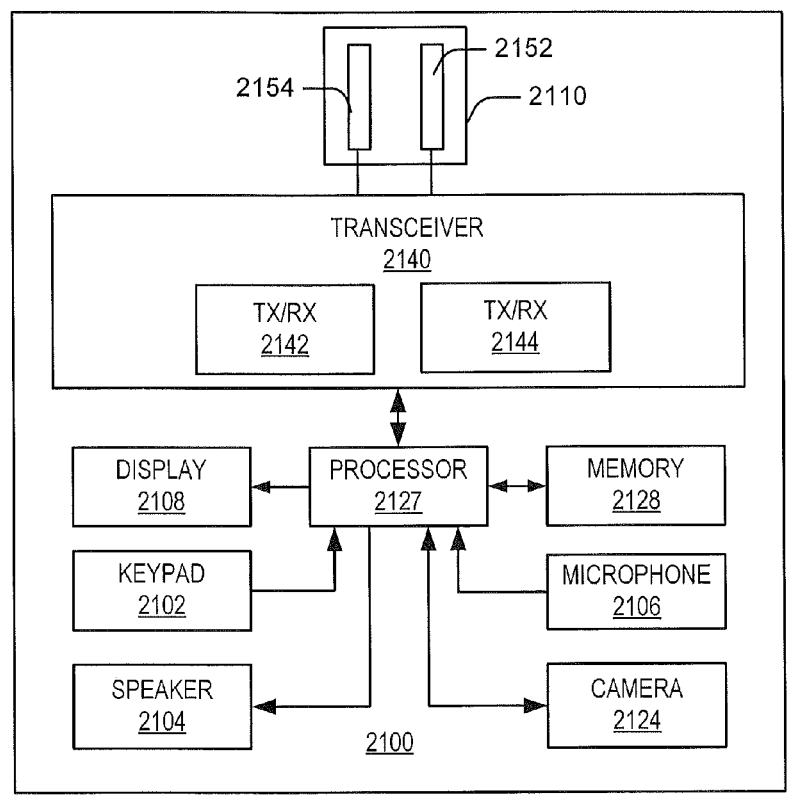
FIG. 21 is a block diagram of a mobile terminal in accordance with some embodiments of the present invention.

FIG. 21 is a block diagram of a wireless communication terminal 2100 that includes a MIMO antenna array in accordance with some embodiments of the present invention. Referring to FIG. 21, the mobile terminal 2100 includes a MIMO antenna array 2110, a transceiver 2140, a processor 2127, and can further include a conventional display 2108, keypad 2102, speaker 2104, mass memory 2128, microphone 2106, and/or camera 2124, one or more of which may be electrically grounded to the same ground plane as the MIMO antenna array 2110. The MIMO antenna array 2110 may be structurally configured as shown for the MIMO antenna arrays of FIGS. 1B and 9, or may be configured in accordance with various other embodiments of the present invention. Moreover, MIMO antennas in accordance with various embodiments of the present invention may be embodied as, but are not limited to, ground free monopole antennas, planar inverted F-antennas (PIFA) radiating elements and/or on-ground antenna radiating elements as well.

The transceiver 2140 may include transmit/receive circuitry (TX/RX) that provides separate communication paths for supplying/receiving RF signals to different radiating elements of the MIMO antenna 2110 via their respective RF feeds. Accordingly, when the MIMO antenna 2110 includes two radiating antenna elements 2152, 2154, the transceiver 2140 may include two transmit/receive circuits 2142, 2144 connected to different ones of the antenna elements via the respective RF feeds.

The transceiver 2140 in cooperation with the processor 2127 may be configured to communicate according using at least one radio access technology in two or more frequency ranges. The at least one radio access technology may include, but is not limited to, WLAN (e.g., 802.11), WiMAX (Worldwide Interoperability for Microwave Access), TransferJet, 3GPP LTE (3rd Generation Partnership Project Long Term Evolution), Universal Mobile Telecommunications System (UMTS), Global Standard for Mobile (GSM) communication, General Packet Radio Service (GPRS), enhanced data rates for GSM evolution (EDGE), DCS, PDC, PCS, code division multiple access (CDMA), wideband-CDMA, and/or CDMA2000. Other radio access technologies and/or frequency bands can also be used in embodiments according to the invention.

It will be appreciated that certain characteristics of the components of the MIMO antennas shown in the figures such as, for example, the relative widths, conductive lengths, and/or shapes of the radiating elements, the conductive neutralization lines, and/or other elements of the MIMO antennas may vary within the scope of the present invention.

Many variations and modifications can be made to the exemplary embodiments without substantially departing from the principles of the present invention. All such variations and modifications are intended to be included herein within the scope of the present invention, as set forth in the following claims.

That which is claimed:

1. A method of operating an electronic device, comprising:
providing a plurality of antenna elements;
evaluating a wireless communication performance criterion to obtain a performance evaluation;
assigning a first one of the plurality of antenna elements to a main wireless signal reception and transmission path and a second one of the plurality of antenna elements to a diversity wireless signal reception path based on the performance evaluation;
determining whether first and second communication channels associated with the main wireless signal reception path and the diversity wireless signal reception path, respectively, have changed; and
updating channel estimation models and/or multipath mitigation modules in a digital baseband signal processing section of the electronic device responsive to a determination that the first and second communication channels associated with the main wireless signal reception path and the diversity wireless signal reception path, respectively, have changed.

2. The method of claim 1, wherein evaluating the wireless communication performance criterion comprises determining transmission power for signals transmitted through each of the plurality of antenna elements and power associated with signals reflected back through each of the plurality of antenna elements.

3. The method of claim 1, wherein evaluating the wireless communication performance criterion comprises determining Received Signal Strength Indication (RSSI) data for each of the plurality of antenna elements.

4. The method of claim 1, wherein evaluating the wireless communication performance criterion comprises processing feedback from a wireless basestation, the feedback including signal strength information for signals transmitted from each of the plurality of antenna elements.

5. The method of claim 1, wherein evaluating the wireless communication performance criterion comprises determining proximity information of structure abutting the mobile terminal via at least one sensor.

6. The method of claim 1, wherein the electronic device is a mobile terminal.

7. A computer program product comprising a non-transitory computer readable program medium, the computer readable program medium comprising computer readable program code configured to carry out the method of claim 1.

8. A method of operating an electronic device, comprising:
providing a plurality of antenna elements;
evaluating a wireless communication performance criterion to obtain a performance evaluation; and
selecting a pair of the plurality of antenna elements for use in wireless communication based on the performance evaluation;
wherein evaluating the wireless communication performance criterion comprises determining a Multiplexing Efficiency where the Multiplexing Efficiency is given by $$\text{Multiplexing Efficiency} = \sqrt{(1+\rho_\in)\eta_1\eta_2}$$

where $\eta_1$ and $\eta_2$ are a total efficiency of a first and a second one of the plurality of antenna elements, respectively and $\rho_\in$ is an envelope correlation coefficient between the first and second one of the plurality of antenna elements.

9. The method of claim 8, wherein evaluating the wireless communication performance criterion comprises determining a Normalized Multiplexing Efficiency where the Normalized Multiplexing Efficiency is given by Normalized Multiplexing Efficiency=Multiplexing Efficiency in Free Space−Multiplexing Efficiency in a User Application.

10. The method of claim 8, wherein the electronic device is a mobile terminal.

11. A computer program product comprising a non-transitory computer readable program medium, the computer readable program medium comprising computer readable program code configured to carry out the method of claim 8.

12. An electronic device, comprising:
a plurality of antenna elements; and
antenna selection control circuitry that is configured to evaluate a wireless communication performance criterion to obtain a performance evaluation, to assign a first one of the plurality of antenna elements to a main wireless signal reception and transmission path and a second one of the plurality of antenna elements to a diversity wireless signal reception path based on the performance evaluation, to determine whether first and second communication channels associated with the main wireless signal reception path and the diversity wireless signal reception path, respectively, have changed, and update channel estimation models and/or multipath mitigation modules in a digital baseband signal processing section of the electronic device responsive to a determination that the first and second communication channels associated with the main wireless signal reception path and the diversity wireless signal reception path, respectively, have changed.

13. The electronic device of claim 12, wherein the antenna selection control circuitry is configured to evaluate the wireless communication performance criterion by determining transmission power for signals transmitted through each of the plurality of antenna elements and power associated with signals reflected back through each of the plurality of antenna elements.

14. The electronic device of claim 12, wherein the antenna selection control circuitry is configured to evaluate the wireless communication performance criterion by determining Received Signal Strength Indication (RSSI) data for each of the plurality of antenna elements.

15. The electronic device of claim 12, wherein the antenna selection control circuitry is configured to evaluate the wireless communication performance criterion by processing feedback from a wireless basestation, the feedback including signal strength information for signals transmitted from each of the plurality of antenna elements.

16. The electronic device of claim 12, wherein the antenna selection control circuitry is configured to evaluate the wireless communication performance criterion by determining proximity information of structure abutting the mobile terminal via at least one sensor.

17. The electronic device of claim 12, wherein the electronic device is a mobile terminal.

18. An electronic device, comprising:
a plurality of antenna elements; and
antenna selection control circuitry that is configured to evaluate a wireless communication performance criterion to obtain a performance evaluation and select a pair of the plurality of antenna elements for use in wireless communication based on the performance evaluation;
wherein the antenna selection control circuitry is configured to evaluate the wireless communication performance criterion by determining a Multiplexing Efficiency where the Multiplexing Efficiency is given by $$\text{Multiplexing Efficiency} = \sqrt{(1-\rho_\in)\eta_1\eta_2}$$

where $\eta_1$ and $\eta_2$ are a total efficiency of a first and a second one of the plurality of antenna elements, respectively and $\rho_\in$ is an envelope correlation coefficient between the first and second one of the plurality of antenna elements.

19. The electronic device of claim 18, wherein the electronic device is a mobile terminal.

* * * * *